(12) United States Patent  
Corcoran

(10) Patent No.: US 7,094,351 B2
(45) Date of Patent: Aug. 22, 2006

(54) PURIFICATION OF SUBSTANCES BY REACTION AFFINITY CHROMATOGRAPHY

(76) Inventor: Robert C. Corcoran, P.O. Box 3112, Laramie, WY (US) 82071

( * ) Notice: Subject to any disclaimer, the term of this patent is extended or adjusted under 35 U.S.C. 154(b) by 526 days.

(21) Appl. No.: 09/975,258

(22) Filed: Oct. 12, 2001

(65) Prior Publication Data

US 2002/0100727 A1    Aug. 1, 2002

Related U.S. Application Data

(60) Provisional application No. 60/239,934, filed on Oct. 12, 2000.

(51) Int. Cl.
*B01D 15/08* (2006.01)

(52) U.S. Cl. ............ 210/635; 210/656; 210/198.2; 436/161

(58) Field of Classification Search .......... 210/635, 210/656, 659, 198.2; 436/161
See application file for complete search history.

(56) References Cited

U.S. PATENT DOCUMENTS

| | | | | |
|---|---|---|---|---|
| 3,894,026 A * | 7/1975 | Sohar | ............. | 260/285 |
| 3,966,410 A | 6/1976 | Jahnsen | ............. | 23/230 B |
| 4,048,416 A * | 9/1977 | Axen | ............. | 525/9 |
| 4,461,876 A | 7/1984 | Lieberman et al. | ............. | 525/374 |
| 4,523,997 A * | 6/1985 | Crane | ............. | 210/635 |
| 4,637,880 A | 1/1987 | Halbert | ............. | 210/638 |
| 4,647,655 A * | 3/1987 | Axen | ............. | 530/390 |
| 4,753,983 A * | 6/1988 | Ngo | ............. | 525/54.1 |
| 4,822,681 A * | 4/1989 | Schossler | ............. | 210/198.2 |
| 4,837,348 A * | 6/1989 | Stolowitz | ............. | 556/9 |
| 4,882,226 A * | 11/1989 | Schutyser | ............. | 210/198.2 |
| 4,886,755 A | 12/1989 | Ngo | ............. | 435/183 |
| 4,927,539 A * | 5/1990 | Stevens | ............. | 210/198.2 |
| 5,051,184 A | 9/1991 | Taylor | ............. | 210/632 |
| 5,078,886 A | 1/1992 | Hsu | ............. | 210/632 |
| 5,141,648 A | 8/1992 | Hylarides et al. | ............. | 210/635 |
| 5,160,626 A | 11/1992 | Pemawansa et al. | ............. | 210/638 |
| 5,240,602 A | 8/1993 | Hammen | ............. | 210/198.2 |
| 5,254,339 A | 10/1993 | Morein | ............. | 424/88 |
| 5,292,840 A | 3/1994 | Heilmann et al. | ............. | 526/304 |
| 5,334,384 A | 8/1994 | Mannix et al. | ............. | 424/94.63 |
| 5,510,421 A | 4/1996 | Dennison et al. | ............. | 525/204 |
| 5,561,097 A | 10/1996 | Gleason et al. | ............. | 502/402 |
| 5,683,916 A | 11/1997 | Goffe et al. | ............. | 436/535 |
| 5,807,997 A | 9/1998 | Batista | ............. | 530/362 |
| 5,837,860 A | 11/1998 | Anderson et al. | ............. | 536/25.3 |
| 5,945,520 A * | 8/1999 | Burton | ............. | 536/20 |
| 5,958,702 A | 9/1999 | Benner | ............. | 435/7.1 |

(Continued)

FOREIGN PATENT DOCUMENTS

EP    0 462 670 A1    12/1991

(Continued)

OTHER PUBLICATIONS

Duerr et al., "Cu(II) Catalyzed Hydrolysis of an Unactivated Ester Based on Reversible Conjugate Addition", Tetrahedron Letters, vol. 30, No. 50, pp. 6951-6954 (1989).

(Continued)

*Primary Examiner*—Ernest G. Therkorn
(74) *Attorney, Agent, or Firm*—Derek F. Freyberg

(57) ABSTRACT

The invention relates to the separation of at least one target from a sample composition using a naturally reversible reaction comprising the formation of at least one covalent bond. One embodiment of the invention is a chromatographic method in which the affinity of a stationary phase for at least one target is based on the equilibrium constant of such a naturally reversible reaction between the stationary phase and the target.

46 Claims, 10 Drawing Sheets

U.S. PATENT DOCUMENTS

| | | | |
|---|---|---|---|
| 6,030,782 A * | 2/2000 | Anderson | 435/6 |
| 6,086,769 A | 7/2000 | Kilambi et al. | 210/638 |
| 6,096,217 A | 8/2000 | Kilambi et al. | 210/638 |
| 6,121,488 A | 9/2000 | Nikam | 564/64 |
| 6,245,507 B1 | 6/2001 | Bogdanov | 435/6 |
| 6,362,008 B1 * | 3/2002 | Kohn | 436/514 |
| 6,426,315 B1 * | 7/2002 | Bergstrom | 502/402 |
| 6,472,522 B1 * | 10/2002 | Horn | 536/25.4 |

FOREIGN PATENT DOCUMENTS

| | | |
|---|---|---|
| FR | 2 605 237 | 4/1988 |
| WO | WO 98/59234 | 12/1998 |
| WO | WO 99/16907 | 4/1999 |
| WO | WO 01/19484 A1 | 3/2001 |

OTHER PUBLICATIONS

Chung et al., "Diene-Substituent Effects on the Rate of the Retro-Diels-Alder Reaction. Cycloreversion Reactivity Varying over a Range of Five Powders of Ten", J. Org. Chem., vol. 53, pp. 1334-1336 (1988).

Chung et al., "Structural Effects Controlling the Rate of the Retro-Diels-Alder Reaction in Anthracene Cycloadducts", J. Org. Chem, vol. 54, pp. 1018-1032 (1989).

Duerr et al., "Copper (II)-catalysed Hydrolysis of an Unactivated Amide. Application of the Groves' Rule to the Hydrolysis of Acrylamide", J. Chem. Soc., Chem. Commun., pp. 1707-1709 (1990).

Nanjappan et al., "Metal Ion Catalyzed Reactions of Acrylonitrile, Acrylamide, and Ethyl Acrylate by way of Their Diels-Alder Cycloadducts", J. Am. Chem. Soc., vol. 109, No. 6, pp. 1826-1833 (1987).

Sammakia et al., "Studies on the Mechanism of Action of 2-Formyl-4-pyrrolidinopyridine : Isolation and Characterization of a Reactive Intermediate", J. Org. Chem., vol. 64, pp. 4652-4664 (1999).

Sammakia et al., "Enhanced Selectivities for the Hydroxyl-Directed Methanolysis of Esters Using the 2-Acyl-4-aminopyridine Class of Acyl Transfer Catalysts: Ketones as Binding Sites", J. Org. Chem., vol. 65, pp. 974-978 (2000).

Sammakia et al., "2-Formyl-4-pyrrolidinopyridine (FDD) : A New Catalyst for the Hydroxyl-Directed Methanolysis of Esters", J. Am. Chem. Soc., vol. 118, pp. 8967-8968 (1996).

Harris et al., eds., *Protein purification methods: a practical approach*, Oxford University Press, New York NY, 1989, pp. 235-237.

\* cited by examiner s-trans conformation      s-cis conformation

1a: R = H, R' = $CH_3$
1b: R = $CH_3$, R' = H 2a     2b     2c

Thebaine     Hydrocodinone     Oxycodone

Ergosterol     Vitamin $D_2$

Affinity Decrease by Neutral to Negative RMod Conversion:

Affinity Decrease by Positive to Neutral RMod Conversion:

R, R', R" = H, alkyl, aryl, heteroaryl. Y, Y' = additional RMod group(s) or H, alkyl aryl heteroaryl; Z = anion stabilizing group, [P] = natural or synthetic polymer or some other group giving phase separation from solutions that substantially dissolve interferents/impurities; X = O, S, NR;

PURIFICATION OF SUBSTANCES BY REACTION AFFINITY CHROMATOGRAPHY

This patent application claims the benefit of priority under 35 U.S.C. § 119(e) to U.S. provisional application No. 60/239,934, filed on Oct. 12, 2000.

The invention relates to the separation of at least one target from a sample composition using a naturally reversible reaction comprising the formation of at least one covalent bond. One embodiment of the invention is a chromatographic method in which the affinity of a stationary phase for at least one target is based on the equilibrium constant of such a naturally reversible reaction between the stationary phase and the target.

BACKGROUND

The purification of substances is one of the most commonly encountered difficulties in the chemical manufacturing industry. Purification may be necessary not only for the end product that is marketed to consumers, but may also be necessary for intermediates that are produced in the course of making the end product from simpler starting materials. As a result, the manner in which purifications are conducted, and their efficacy in accomplishing purification at satisfactory level, may have a substantial economic impact on the production of chemical substances. A diverse array of methods have been employed for this purpose.

Purification by Extraction

It is sometimes the case that the substance(s) of interest, i.e. target(s), in a separation may substantially differ in their solubility characteristics from the other, undesired substances present in the mixture i.e., interferents/impurities, to such a degree that they may be purified by simple extraction procedures. For example, a compound that is largely insoluble in water may be separated from water soluble interferents/impurities by shaking the mixture with water and a water immiscible solvent. After allowing the two immiscible phases to separate, the interferents/impurities will be in the aqueous phase, while target(s) will be in the water immiscible phase. Physical separation of the two phases and subsequent evaporation of the water immiscible solvent will yield the target(s).

In another example, target(s) that exhibit significant degrees of acid or basic properties can be separated in a variant of this procedure that involves the temporary modification of the charge state of a target(s) by appropriate modification of the pH of the aqueous phase. The change in charge state may convert neutral water insoluble target(s) to water soluble species that can be separated by extraction from neutral interferents/impurities. A subsequent change in the aqueous pH to return to neutral water insoluble target(s) allows their separation from water soluble interferents/impurities through an additional extractive procedure.

Though the extractive procedures described above are amongst the most powerful and inexpensive tools that may be used in the purification of substances they typically suffer from a lack of specificity. In particular, these extractive methods will not separate substances that share similar solubility properties. Thus, procedures of this type are often referred to as "group separations" in which groups of compounds having similar gross solubility properties are separated from other groups of compounds having differing gross solubility properties.

Purification of Substances by Distillation and Crystallization

Fractional or simple distillation are amongst the most effective and least expensive methods that can be employed for the purification of appropriate substances. However, this technique can not be employed for substances having low vapor pressures or that are thermally unstable. Many substances fall into this category, and so distillation is used primarily for the purification of the simple, low molecular substances that serve as the ultimate starting materials for the synthesis of compounds of greater economic interest.

Crystallization may also be an extremely effective method for purification of some substances. It is well suited to the purification of large amounts of material and can be easily performed. However, many substances do not crystallize readily. In many instances the crystallization of a substance may be adversely affected by the presence of significant quantities of interferents/impurities. Since this is a commonly encountered situation in many chemical syntheses, the use of crystallization in industrial operations, while extremely important for many chemical manufacturing processes, cannot be said to be of extremely broad utility and reliability.

Purification of Substances by Derivatization

One of the means by which difficulties in crystallization or separation by other means may be circumvented is the use of chemical derivatization. In this procedure, a target may be subjected to a chemical reaction with some co-reactant to convert it to new substance i.e., a derivative, that has substantially different physical properties. These different properties may be solubility, or susceptibility to crystallization, or some other property. After separation of a derivative from interferents/impurities, another chemical reaction is applied to the derivative to convert it back to the target.

Though occasionally employed, this procedure may suffer from disadvantages. For example, there are few chemical reactions that proceed in 100% yield. Since two chemical reactions are involved in this overall process (formation of a derivative and reconversion back to a target) decreases in overall yield of purified target are likely. The process may also be costly from a number of standpoints: the chemical reactions involved require some amount of time, and the reagents and derivatizing agents have associated expenses. The latter often represents a particular problem since it is rare that the process of returning to a target from a derivative yields the derivatizing agent in a form that can be reutilized directly for other purifications.

Purification of Substances by Chromatography

Probably the most versatile method for the purification of a wide variety of chemical substances is chromatography. Most chromatography methods separate substances on the basis of their differential affinities for a stationary phase and a mobile phase. These two phases may both be liquid (e.g., as for countercurrent chromatography), but the combinations in most common use are gas with liquid (gas liquid chromatography, GLC or GC) and liquid with solid. The latter category is that which is most commonly employed for the purification of significant quantities of substances. The basic principles of chromatography are the same for all of these methods.

In one version of liquid-solid chromatography, a mixture of substances is applied (often in the form of a solution) to the top of a column that contains a granular or powdered solid adsorbent (e.g., silica gel, alumina). The mixture is then eluted by passing an appropriate solvent (the eluent) through the column and collecting it in portions at the bottom of the column. It is during the process of elution that separation of the substances occurs, and the cause of the separation is the differential affinities of the substances for the solid phase and the liquid phase (the eluent). For example, consider substances A and B. in which A has a much stronger affinity for the solid phase than the liquid phase, and B has a much stronger affinity for the liquid phase than the solid phase. As the eluent flows through the column, both substances will be in equilibrium between the solid phase and the liquid phase; that is, each substance will spend part of the time dissolved in the liquid phase and part of the time adsorbed onto the solid phase. In the example presented, A will spend most of its time adsorbed to the solid, while B will spend most of its time in the liquid. The solid is not moving through the column (i.e., is the stationary phase), and since A is usually (but not always) adsorbed to the solid, it will move through the column very slowly. On the other hand, B will move through the column very rapidly, since it will generally be in the mobile liquid phase. Because of their different rates of travel through the column, A and B will thus be physically separated.

Since it is the differences in affinities that substances have for the solid and liquid phases that is responsible for their different rates of travel through a column (and hence their separation), it is clear that the nature of these affinities is critical to the separation process. Typically, the affinity of a substance for a solid or liquid phase is due to the sum of a large number of weak intermolecular forces. These may include ion-dipole interactions (amongst the strongest of which is hydrogen bonding), charge-charge interactions, and hydrophobic interactions. The three dimensional disposition of functional groups in a molecule, along with the propensity of each of these functional groups to engage in these types of interactions with either the stationary or mobile phases are what determine the rate of travel in the elution process.

Problems with Chromatography

There are, however, some practical problems with the chromatographic separation of substances that arise as a consequence of the presence of interferents/impurities. The two general classes of interferents/impurities that may rise to problems in chromatographic separations are those that are difficult to elute and those that elute at a rate similar to a target.

Difficultly eluted interferents may, for example, be a problem when there is a desire to reuse the stationary phase for repeated separations. Stationary phases can be quite expensive, and the ability to use the column for multiple purifications may lead to a significant cost savings. For example, in order to take advantage of the reusability of a stationary phase it may be necessary that a majority of the substances in a sample applied to the column be eluted prior to applying a second batch of sample. Otherwise, more slowly moving substances from the first chromatography may elute in conjunction with a target in the second chromatography. Additionally, if difficultly eluted interferents are present in a sample, then large volumes of eluent may be necessary to remove them, which may result in higher costs associated with eluent purchase. In some cases, interferents may be irreversibly adsorbed to the column. In this case, it may be necessary to perform sample pretreatment to remove these irreversibly adsorbing interferents prior to loading on the column. Alternatively, a sacrificial pre-column can be placed in front of the true separation column, and then discarded when it is saturated with irreversibly adsorbing interferents. Both of these solutions, however, may be undesirable due to the costs in materials and time they entail.

Eluents that elute at a similar rate to the target may pose a more subtle problem in some circumstances. Chromatography may be performed in what has been termed the "analytical regime" or the "overload regime." In the analytical regime, the proportions of the substances being separated to the amount of stationary phase is such that a true equilibrium between the mobile and stationary phases may be established. Within the analytical regime, the time it takes a substance to elute will not be substantially affected by amount loaded onto the column. In the overload regime, a much larger amount of the substance is applied to the column. In this case, there is not sufficient stationary phase to fully adsorb the substances present, and a true equilibrium does not exist. The result is that sample bands move faster, and they broaden, which may decrease the resolution of the separation. In other words, substances that might be separated readily with low sample loading (in the analytical regime) may not separate well when higher loading levels are employed (in the overload regime).

The change in retention behavior associated with different loading levels may not be desirable. For example, loading in the analytical range may utilize weight ratios of sample to stationary phase on the order of 1:100 or much higher, whereas the overload regime might utilize only a 1:10 ratio. Thus, in this example, for a given amount of stationary phase, one may perform a chromatography one time in the overload regime versus ten times in the analytical regime. Since roughly the same quantities of eluent are required in each case, the analytical regime separation may require a higher cost. Separations in an overload mode may therefore be desirable in some applications. For example, this may only be carried out if a good enough separation has been achieved that the band broadening and increased rate of travel associated with this process does not result in overlapping of elution bands.

SUMMARY OF THE INVENTION

The invention, in one embodiment, relates to a novel method of separating at least one target from a sample composition comprising: contacting the sample composition with at least one reactive affinity molecule, said at least one reactive affinity molecule comprising at least one reactive functional group that reacts with the at least one target to form at least one adduct, wherein said reaction is a naturally reversible reaction comprising the formation of at least one covalent bond, and wherein said at least one reactive affinity molecule is attached to at least one phase separating group. The method may further comprise, for example, recovering said target by contacting the adduct with at least one eluant. The eluant, may also, for example, change the equilibrium constant of the reaction such as, for example, by exposing the adduct to a change in at least one property chosen from polarity, temperature, and pH.

The invention, in another embodiment, relates to a chromatographic method comprising: contacting a sample composition comprising at least one target with at least one reactive affinity molecule, said at least one reactive affinity molecule comprising at least one reactive functional group that reacts with the at least one target to form at least one adduct, wherein said reaction is a naturally reversible reaction comprising the formation of at least one covalent bond, and wherein said at least one reactive affinity molecule is attached to at least one solid support.

The invention also relates to a method of separating at least one target from a sample composition comprising adding a water immiscible solution comprising said sample composition to an aqueous solution comprising at least one reactive affinity molecule wherein said at least one reactive affinity molecule comprises at least one water solubilizing group and at least one reactive functional group; wherein said at least one reactive functional group reacts with the at least one target to form a water soluble adduct, wherein said reaction is a naturally reversible reaction comprising the formation of at least one covalent bond; allowing the water immiscible solution and the aqueous solution to separate; and recovering said at least one target from the aqueous solution by extraction. In another embodiment, the at least one target may be recovered from the aqueous solution by reversing the naturally reversible reaction, e.g., changing the equilibrium constant of the reaction, which may, for example, be followed by extraction.

The invention also relates to a composition comprising at least one reactive affinity molecule that comprises at least one reactive functional group, wherein the at least one reactive functional group reacts with at least one target to form at least one adduct, wherein said reaction is a naturally reversible reaction comprising the formation of at least one covalent bond; and at least one phase separating group that imparts solubility of said composition in a liquid phase.

In another embodiment, the invention relates to a chromatographic resin comprising at least one reactive affinity molecule that comprises at least one reactive functional group, wherein said at least one reactive functional group reacts with the at least one target to form at least one adduct, wherein said reaction is a naturally reversible reaction comprising the formation of at least one covalent bond.

Also within the practice of the invention is an apparatus comprising at least one chromatographic column that comprises at least one reactive affinity molecule, wherein said at least one reactive affinity molecule comprises at least one reactive functional group that reacts with the at least one target to form at least one adduct, wherein said reaction is a naturally reversible reaction comprising the formation of at least one covalent bond.

The invention also allows, for example, for a method for isolating thebaine from a sample composition comprising: contacting the sample composition with at least one reactive affinity molecule, said at least one reactive affinity molecule comprising at least one reactive functional group that reacts with the at least one thebaine to form at least one adduct, wherein said reaction is a naturally reversible reaction comprising the formation of at least one covalent bond, and wherein said at least one reactive affinity molecule is attached to at least one phase separating group. Also within the practice of the invention is thebaine separated from a sample composition by the above method.

DETAILED DESCRIPTION OF THE INVENTION

Figure 1:
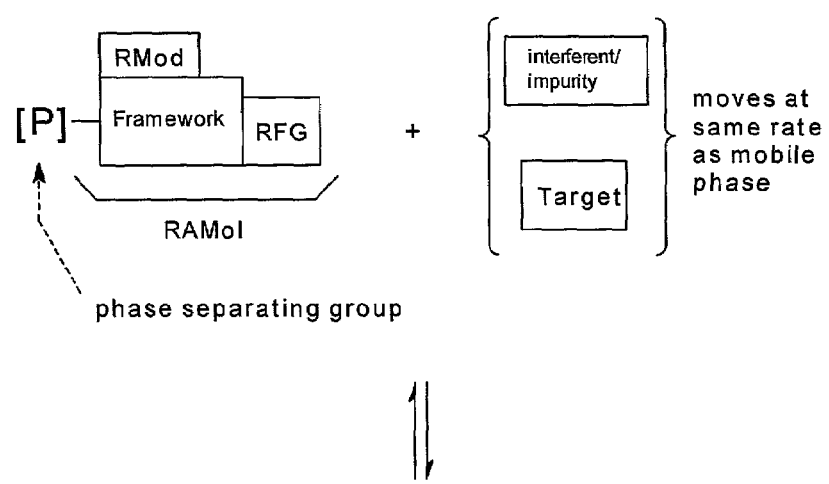
FIG. 1. Example of Reactive Affinity Chromatography (RAC). In this example, the Reactive Affinity Molecule (RAMol) is composed of a Framework, a Reactive Functional Group (RFG) that undergoes a reaction with at least one target, and Reactivity Modifier (RMod) group that modifies the reactivity of the RFG. The RAMol is attached to a phase separating group [P] that causes the RAMol to occupy a different phase than the at least one target or interferents/impurities.
Figure 1:
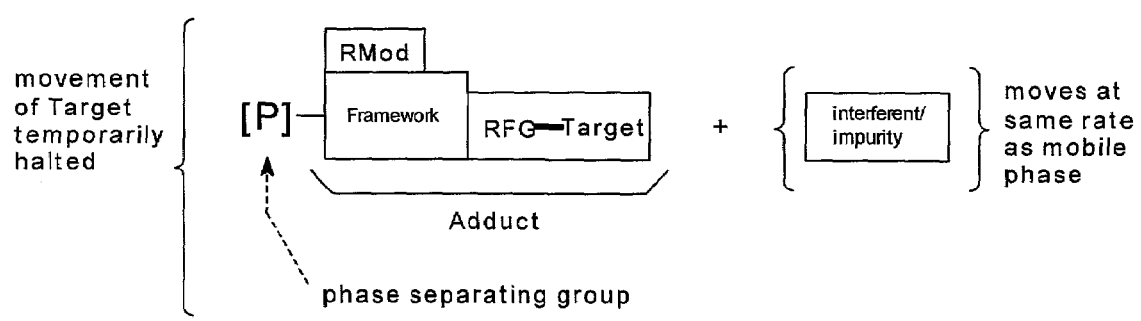

The invention, which may in some embodiments be referred to as Reactive Affinity Chromatography (RAC), comprises at least one reactive affinity molecule (RAMol) which comprises at least one reactive functional group (RFG). In one embodiment, the RAMol comprises at least one additional group chosen from at least one framework group and at least one reactivity modifier (RMod). For example, the reactive affinity molecule may further comprise at least one reactivity modifier group and at least one at least one framework group. In one embodiment, the invention is illustrated in FIG. 1: a (RAMol) consisting of a framework group, RFG and RMod is attached to a phase separating group, [P]. Affinity resin, as used herein, refers to the combination of at least one RAMol and a phase separating group.

The RAMol undergoes a naturally reversible reaction with a target to form an adduct. Adduct, as used herein, is simply the product of the reaction between at least one RAMol and at least one target. The extent to which the at least one target tends to be present as the adduct may be described by an equilibrium constant, K, with a large value of K indicating a greater fraction of the target existing in the form of the adduct than with a smaller value of K.

The invention, in one embodiment, is a method of separating a target from a sample composition using a novel chromatographic method that bases the affinity of a target for a phase separating group, e.g., a stationary phase, on the propensity to undergo a naturally reversible reaction to form an adduct. In one embodiment, if the naturally reversible reaction is chosen appropriately, then only a single target, or a very limited number of species in a target class will be capable of undergoing the naturally reversible reaction that serves as the basis of chromatographic affinity. Since the affinity of substances for the phase separating group is based on this naturally reversible reaction, all of the remaining substances in the sample will be unretained to any significant extent. In another embodiment, if a naturally reversible reaction is chosen that is very specific to certain structural features in the target, then a very limited number of compounds will be capable of undergoing the reaction. Thus, the likelihood of encountering closely eluting interferents may be substantially reduced. It should be clear that the methods of the invention may be extended through the utilization of different types of naturally reversible reactions to the purification of different target classes of compounds.

Once the adduct is formed, the target may be recovered by any means available to one of skill in the art. For example, the target may be recovered by simple elution or extraction in which the naturally reversible reaction releases the target over time. In another embodiment, the target may be recovered by changing the equilibrium constant of the naturally reversible reaction in order to speed up the reaction from adduct to target. The equilibrium constant may be changed, for example, by exposing the adduct to a change in at least one property chosen from polarity, temperature, and pH. In one embodiment, an eluant or reaction medium is used to change the at least one property. In a further embodiment, the change in equilibrium constant of the reaction is due to interaction of the eluant or reaction medium with the reactivity modifier.

For example, the operation of a simple embodiment of the invention may be illustrated for the separation of thebaine from a mixture of opium alkaloids. Thebaine is an unusual alkaloid in that it incorporates a 1,3-diene substructure, a feature that is not present in any of the known compounds in opium. It has been shown that the 1,3-diene substructure of thebaine undergoes a naturally reversible cycloaddition reaction with aryl nitroso compounds. Thus, thebaine may be purified by the methods of the invention, for example, in the following manner. A nitroso group (a reactive functional group) is attached to a phenyl group (a framework) which is, in turn, attached to a polymer (the phase separating group). The resulting resin may be loaded into a chromatographic column. If a sample composition comprising thebaine and other opium alkaloids is applied to this column and then eluted with a solvent, the 1,3-diene subunit of the target thebaine will react with the reactive functional group in a reversible fashion to temporarily form a covalent nitroso-thebaine adduct. While in the form of this adduct, the "thebaine" will not move with the rest of the eluant and other alkaloids in the sample composition, since it is covalently attached to the resin by way of its bonds to the nitroso group. Since the cycloaddition reaction is naturally reversible, however, the nitroso-thebaine adduct will break down to give the resin immobilized aryl nitroso and free thebaine. The released thebaine will then move with the eluant until it encounters another nitroso group and is once again temporarily immobilized in the form of an adduct. As this process repeats itself innumerable times, the thebaine will be separated from the other components originally present in the sample composition by virtue of the fact that it is repeated, though temporarily immobilized on the resin by virtue of its naturally reversible reaction with the nitroso functional group. The other components of the sample will not be retained by the resin, since they lack the requisite 1,3-diene that reacts with the reactive functional group. Thus, they will move through the chromatographic column at the same rate as the eluent.

A target is any compound or substance(s) of interest that one may desire, for example, to remove, isolate, or separate from a sample composition. A target, in one embodiment, is at least one impurity. A target class can be a group of at least two targets that are similar, for example, in their structure and/or reactivity.

Chromatography, as used herein, refers to methods of removing, isolating, or separating at least one substance on the basis of differential affinities for a stationary phase and a mobile phase. These two phases may, for example, both be liquid (e.g., as for countercurrent chromatography), gas with liquid (gas liquid chromatography, GLC or GC) and liquid with solid.

Separating, as used herein, is any separation of at least one target from a sample composition including, but not limited to separating by time, space, and phase. Separating includes, for example, the isolation of a target from a sample composition, the removal of a target from a sample composition, or the separation in space of a target from other compounds in a sample composition.

An "alkyl" group as used herein is a straight-chain, branched-chain, or cyclic hydrocarbon radical having from 1 to 20 carbon atoms, for example 1 to 10 carbon atoms, for example 1, 2, 3, 4, 5, 6, 7, 8, 9 or 10 carbon atoms. The phrase alkyl group includes saturated alkyl group, unsaturated alkyl groups, substituted alkyl groups and unsubstituted alkyl groups. For instance, the alkyl group may comprise 1 or 2, or 1 to 4, or 1 to 6, or 1 to 8, or 1 to 10, or 2 to 10, or 4 to 10, or 6 to 10 or 8 to 10 carbon atoms. An "alkyl" group also may be a cyclic group, for example 1 ring, or 2 or more fused rings. The rings can contain, for example, 5 or 6 carbon atoms in each ring. An "alkyl" group may be saturated, unsaturated or partially unsaturated. Moreover, any methylene ($-CH_2-$) group, or each of two or more non-adjacent methylene groups, in the alkyl group may be replaced by an oxygen atom or nitrogen atom.

An "aryl" group as used herein is an aromatic carbocyclic ring or fused carbocyclic ring structure that comprises at least one benzene ring. The phrase aryl group includes substituted aryl groups and unsubstituted aryl groups. The aryl group may contain, for example, 1 ring. The aryl group could also contain, for example, 2 or more fused rings, such as 2, 3 or 4 rings. When the aryl group contains multiple rings, each ring may contain, independently, 5 or 6 carbon atoms Examples of aryl groups include phenyl, naphthyl, 1, 2, 3, 4-tetrahydronaphthyl and indenyl groups.

A "heteroaryl" group according to the invention is an aromatic ring or fused ring structure wherein one or more carbon atoms of the ring structure are replaced by O, N, or S. The phrase heteroaryl group includes substituted heteroaryl groups and unsubstituted heteroaryl groups. The heteroaryl group may contain, for example, 1 ring. The heteroaryl group could also contain, for example, 2 or more fused rings, such as 2, 3, or 4 rings. When the heteroaryl group contains multiple rings, each ring may contain, independently, 5 or 6 ring atoms. Example heteroaryl groups include pyridinyl, thienyl, and isoquinolinyl groups.

The alkyl, aryl, and heteroaryl groups may be substituted by one or more further alkyl, aryl or heteroaryl groups or combinations thereof. Any alkyl, aryl or heteroaryl group may also be substituted by one or more electron donating groups or one or more electron withdrawing groups, or combinations thereof. Furthermore, any fused ring alkyl, aryl or heteroaryl group may be substituted on all rings, or on some rings but not others, with the substituents being identical or different.

An "electron withdrawing group" is a substituent that draws electrons to itself more than a hydrogen atom would if it occupied the same position. Example electron withdrawing groups include halogen, nitro, cyano, hydroxyl, fluoroalkyl, perfluoroalkyl, nitrile, carboxyl, carboxylic ester, amide, sulfoxide, sulfone, carbonyl and ammonium groups. The carbonyl groups may exist as ketones or as aldehydes. "Halogen" according to the invention means fluorine, chlorine, bromine, or iodine. The "alkyl" in "fluoroalkyl" and "perfluoroalkyl" according to the invention takes the meaning of "alkyl" as defined above. An "electron donating group" is a substituent that draws electrons to itself less than a hydrogen atom would if it occupied the same position. Example electron donating groups include hydroxyl groups, alkoxy groups, for example, methoxy groups, ethoxy groups, amino groups, monoalkyl- and monoarylamino groups, and dialkyl-, alkylaryl- and diarylamino groups. The "alk" in "alkoxy" according to the invention takes the meaning of "alkyl" as defined above.

Naturally reversible reaction, as used herein, is a reaction that can reverse itself without the addition of any additional chemical reagents. In the practice of the invention, a naturally reversible reaction between at least one reactive functional group of at least one reactive affinity molecule and at least one target forms at least one adduct. In one embodiment, a naturally reversible reaction occurs at a rate having a half-life of about 4 hours or less at 25° C., such as, for example, about 3 hours, about 2 hours, about 1 hour, about 30 minutes, about 10 minutes, about 1 minute and less than about 1 minute, such as, for example, about 1 second, about $\frac{1}{10}$ of a second, about $\frac{1}{100}$ of a second, and about $\frac{1}{1000}$ of a second.

Covalent bond, as used herein, is a bond that results when at least two electrons are shared by two atomic nuclei. Covalent bonds may range from nonpolar, which involve electrons shared by two atoms, to extremely polar, where the bonding electrons are unevenly shared. A covalent bond, as used herein, does not include a bond between a metal or metaloid and a carbon, nitrogen, oxygen or sulfur. In one embodiment, a naturally reversible reaction comprises the formation of at least one covalent bond, such as, for example, at least two covalent bonds.

An eluant is used to separate or extract one material from another. An eluant may be any composition, such as a solution, that assists in the recovery of at least one target from a chromatographic medium. In one embodiment, an eluant is used to recover at least one target by contacting at least one adduct with the eluant. A eluant may, for example, be moving or mobile with respect to a stationary phase. An eluant may be chosen from a gas phase composition and a liquid phase composition. For example, an eluant may be chosen from, water, alcohols, hydrocarbons, and ethers, wherein alcohols include, but are not limited to methanol, ethanol, propanol, isopropanol and butanol, wherein ethers include, but are not limited to propyl ethers, ethyl ethers, butyl ethers, and mixed ethers and wherein hydrocarbons include, but are not limited to, benzene, toluene, xylenes, mesitylenes, hexanes, heptanes, octanes and nonanes.

A reaction medium is any medium where the reaction between the at least one reactive functional group and the at least one target takes place. A reaction medium may be chosen from a gas phase composition and a liquid phase composition. In one embodiment, a reaction medium is stationary with respect to the stationary phase. For example, a reaction medium may be chosen from, water, alcohols, hydrocarbons, and ethers, wherein alcohols include, but are not limited to methanol, ethanol, propanol, isopropanol and butanol, wherein ethers include, but are not limited to ethyl ethers, propyl ethers, butyl ethers and mixed ethers, and wherein hydrocarbons include, but are not limited to, benzene, toluene, xylenes, mesitylenes, hexanes, heptanes, octanes and nonanes.

In one embodiment, the temperature of the adduct may be changed. The temperature of an adduct may be changed in order to vary the equilibrium constant of the naturally reversible reaction. The temperature of the adduct may be varied by any method including varying the temperature of the phase separating group and the reactive affinity molecule, varying the temperature of the eluting solution, and varying the temperature of the reaction medium. After changing the temperature of the adduct, a target may be recovered by contacting the adduct with at least one eluant or by any extraction method.

In another embodiment, the adduct may be contacted with at least one eluant that changes the equilibrium constant of the reaction. An eluant that changes the equilibrium constant of the reaction may be added, for example, immediately after the sample composition comprising the adduct is loaded, or, for example, as a second or subsequent eluant. An eluant may change the equilibrium constant of the reaction, for example, by changing at least one property chosen from polarity and pH. The target may, for example, be recovered by the eluting solution that changes the equilibrium constant of the reaction or by an additional eluting solution. In another embodiment, the adduct may be contacted with at least one reaction medium that changes the equilibrium constant of the reaction. For example, a reaction medium may change the equilibrium constant of the reaction by changing at least one property chosen from polarity and pH. The target may, for example, be recovered by any extraction method.

Framework Group

The framework group or framework is simply the molecular substructure to which the other components of the RAMol are linked together. It may contain as few as one atom, but may be composed of at least two atoms. In one embodiment, at least one framework group comprises at least one group chosen from alkyl groups, aryl groups, and heteroaryl groups. In one embodiment, frameworks that involve aromatic or heteroaromatic rings may offer the advantage of modifying the characteristics of the RFG. However, in some circumstances aliphatic and cycloaliphatic frameworks may be more appropriate, especially if the reaction that is the basis of the affinity reaction can occur with aromatic rings. As appropriate to the nature of the sample medium, the framework may contain groups that lend it solubility or other compatibility with the sample medium.

Reactive Functional Group (RFG)

The RFG comprises at least one group that is known to undergo a naturally reversible chemical reaction with at least one target leading to the formation of at least one covalent bond. This formation of at least one covalent bonds distinguishes the behavior of the RAMol and this invention from many other chromatographic methods, in which the interactions responsible for retaining the target in the stationary phase are non-covalent. The RFG is not a metal or a metalloid. RFGs for use in the practice of the invention include, but are not limited to, groups that comprises at least one group chosen from N=N, C=C, C=O, N=O, C=N, C=S, and C≡C.

In one embodiment, the specificity of the reaction allows RAC to selectivity retain compounds of a target class (for example, targets that contain functional groups capable of reacting with the RFG) while effectively ignoring (failing to retain) all other molecules. A consequence that follows from this discrimination is that the bulk of a sample may not be retained on the stationary phase, and problems from difficultly eluted substances may not be significant. From the fact that the rates of chemical reaction and the corresponding equilibrium constants for the formation of adducts may be quite sensitive to subtle differences near the reactive atoms in the RFG and target, it follows that the RAC method is expected to discriminate between different members of the same target class. This discrimination may be increased in a rational fashion by appropriate modification of the reactivity of the RFG through manipulation of at least one RMod group, thus decreasing the likelihood of difficulties in separating closely eluting targets.

Of course the choice of reactive functional group will depend on the target and will be based on the ability of a reactive functional group to undergo a naturally reversible reaction with the target. One of skill in the art will be able to choose a reactive functional group and a reactive affinity molecule in light of the target desired. Examples include, a reactive functional group comprising at least one N=O, wherein said target comprises at least one 1,3 diene, and a reactive functional group comprising at least one group chosen from C=O, C=NR, C=C and RO—C=O, wherein R is chosen from H, alkyl, aryl, and heteroaryl and said target comprising at least one group chosen from alcohols, amines, and thiols. More Examples of reactive functional groups and targets are shown in Tables 1–5.

TABLE 1
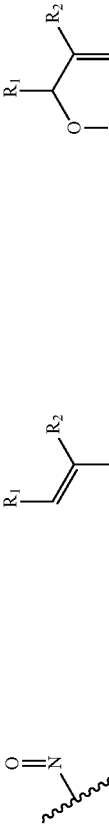

TABLE 1-continued
| Reactive Functional Group | Target | Reactive Affinity Molecule - Target Adduct | Notes |
|---|---|---|---|
| 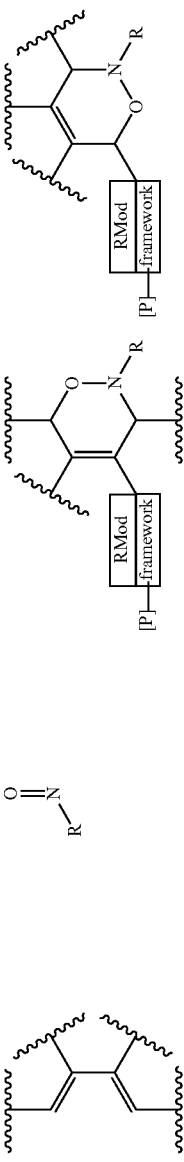 | 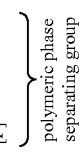 |  | RAMol obtained by reaction of poly(4-chloromethyl)vinylbenzene with triphenylphosphine, then n-BuLi, then 3-ethoxymethacryloyl chloride |
| | specific example:  | | |

TABLE 2

| Reactive Functional Group | Target | Reactive Affinity Molecule - Target Adduct | Notes |
| --- | --- | --- | --- |
| [aldehyde: R-CHO] | ROH | [P]–[framework–RMod]–C(OH)(OR)H | RMod/framework usually electron withdrawing |
| [aldehyde: R-CHO] | RSH | [P]–[framework–RMod]–C(OH)(SR)H | RMod/framework usually electron withdrawing |
| [aldehyde: R-CHO] | RR'NH | [P]–[framework–RMod]–C(OH)(NRR')H and/or [P]–[framework–RMod]–CH=$^+$NRR' | RMod/framework usually electron withdrawing |

Specific example:

[P]–(C$_6$H$_4$)–CH$_2$–N$^+$(pyridinium-3-carboxaldehyde) + ROH target ⇌ [P]–(C$_6$H$_4$)–CH$_2$–N$^+$(pyridinium-3-yl)–C(HO)(OR)H polymeric phase separating group / RMod/framework covalent adduct
RAMol derived from pyridine-3-carboxaldehyde and poly(4-chloromethyl)vinylbenzene

| Reactive Functional Group | Target | Reactive Affinity Molecule - Target Adduct | Notes |
| --- | --- | --- | --- |
| [ketone: R-CO-R$_{(z)}$] | ROH | [P]–[framework–RMod]–C(OH)(OR)H | RMod/framework usually electron withdrawing. R$_{(z)}$ usually electron deficient carbon |
| [ketone: R-CO-R$_{(z)}$] | RSH | [P]–[framework–RMod]–C(OH)(SR)H | RMod/framework usually electron withdrawing. R$_{(z)}$ usually electron deficient carbon |
| [ketone: R-CO-R$_{(z)}$] | RR'NH | [P]–[framework–RMod]–C(OH)(NRR')H and/or [P]–[framework–RMod]–CH=$^+$NRR' | RMod/framework usually electron withdrawing. R$_{(z)}$ usually electron deficient carbon |

Specific example:

[P]–(C$_6$H$_4$)–CH$_2$–O–CH$_2$–(pyridin-5-yl)–C(=O)–CF$_3$ (RFG↓, RMod↗) + ROH target ⇌ [P]–(C$_6$H$_4$)–CH$_2$–O–CH$_2$–(pyridin-5-yl)–C(CF$_3$)(OH)(OR)

polymeric phase separating group / RMod/framework covalent adduct
RAMol from reaction of anion of 6-bromo-3-pyridinemethanol with poly(4-chloromethyl)vinylbenzene, then n-BuLi, then CF$_3$COOEt

TABLE 3

| Reactive Functional Group | Target | Reactive Affinity Molecule - Target Adduct | Notes |
| --- | --- | --- | --- |
| (acyl-O[R]) | ROH | (RMod-framework-C(O)-OR + [R]—OH) | RMod/framework usually electron withdrawing, [R] usually attached to framework |
| (acyl-O[R]) | RSH | (RMod-framework-C(O)-SR + [R]—OH) | RMod/framework usually electron withdrawing, [R] usually attached to framework |
| (acyl-O[R]) | RR'NH | (RMod-framework-C(O)-NRR' + [R]—OH) | RMod/framework usually electron withdrawing, [R] usually attached to framework |
| specific example: benzofuranone [P]-framework with R', R" + ROH target ⇌ phenol covalent adduct | | | RAMol derived from polyvinyl phenol by alkylation with allyl bromide (R'=R"=H), Claisen rearrangement, ozonolysis with oxidative work up, and acid catalyzed dehydration to lactone |
| (alkene with Z) | ROH | [P]-framework-RMod-C(RO)(H)-C-Z OR [P]-framework-RMod-C(Z)(H)-C-OR | Z = anion stabilizing e.g. carbonyl, nitro, sulfonyl, etc. |
| (alkene with Z) | RSH | [P]-framework-RMod-C(RS)(H)-C-Z OR [P]-framework-RMod-C(Z)(H)-C-SR | Z = anion stabilizing e.g. carbonyl, nitro, sulfonyl, etc. |
| (alkene with Z) | RR'NH | [P]-framework-RMod-C(RR'N)(H)-C-Z OR [P]-framework-RMod-C(Z)(H)-C-NRR' | Z = anion stabilizing e.g. carbonyl, nitro, sulfonyl, etc. |
| (alkene with Z) | RR'NH | [P]-framework-RMod-C(RR'NR"+)-C-Z(−) OR [P]-framework-RMod-C(Z)(−)-C-R"NRR'+ | Z = anion stabilizing e.g. carbonyl, nitro, sulfonyl, etc. |
| specific example: [P]-Ph-C(O)-CH=CH2 (RFG, Z/RMod) + RR'NH target ⇌ [P]-Ph-C(O)-CH2-CH2-NRR' covalent adduct | | | RAMol derived from poly(4-bromo)vinylbenzene by reaction with n-BuLi, then acryloyl chloride |

TABLE 4

| Reactive Functional Group | Target | Reactive Affinity Molecule - Target Adduct | Notes |
|---|---|---|---|
| 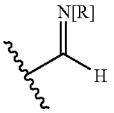 | ROH | 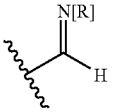 | RMod/framework usually electron withdrawing, [R] usually attached to framework |
| 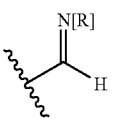 | RSH | 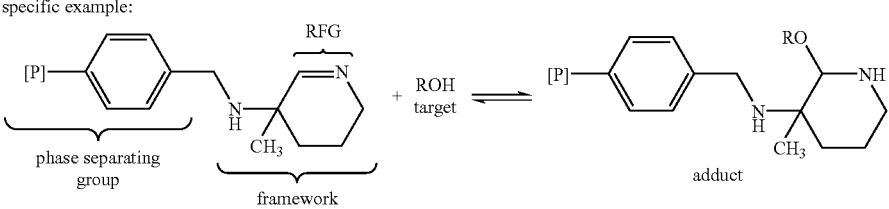 | RMod/framework usually electron withdrawing, [R] usually attached to framework |
| 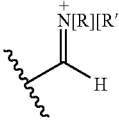 | RR'NH | 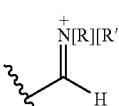 | RMod/framework usually electron withdrawing, [R] usually attached to framework |
| specific example: 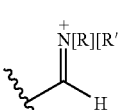 | | | RAMol from reaction of 2-methylornithine with DCC, then DIBAL reduction, then reaction with poly(4-chloromethyl)vinylbenzene. Separation facilitated by trace acid. |
| 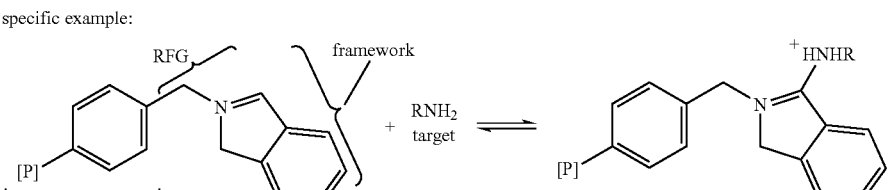 | ROH | | RMod/framework usually electron withdrawing, [R] usually attached to framework |
| | RSH | | RMod/framework usually electron withdrawing, [R] usually attached to framework |
| | RR'NH | | RMod/framework usually electron withdrawing, [R] usually attached to framework |
| specific example: | | | RAMol from reaction of 2-carboxybenzaldehyde with poly(4-methylamino)vinylbenzene/NaBH₃CN, then DIBAL reduction of resulting lactam. |

TABLE 5

| Reactive Functional Group | Target | Reactive Affinity Molecule - Target Adduct | Notes |
|---|---|---|---|
| 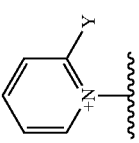 | ROH | 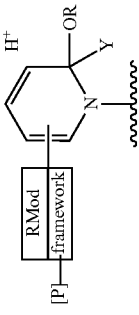 | Attachment of RFG can be at any carbon of ring, or via Y. Y will usually be non-carbon and attached to framework |
| 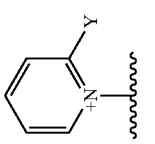 | RSH | 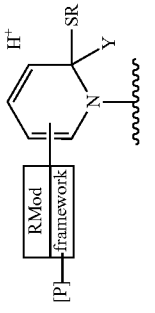 | Attachment of RFG can be at any carbon of ring, or via Y. Y will usually be non-carbon and attached to framework |
| 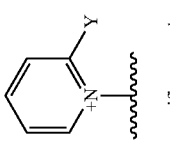 | RR'NH | 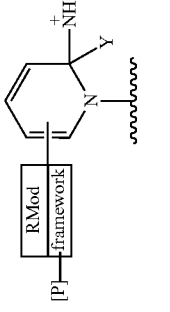 | Attachment of RFG can be at any carbon of ring, or via Y. Y will usually be non-carbon and attached to framework |
| specific example: 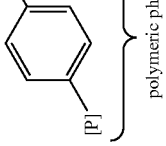 | *ROH target | 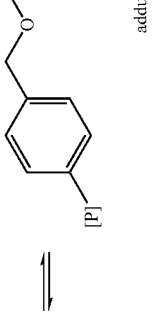 adduct | RAMol is chiral, reacts selectively with one enantiomer of chiral alcohol *ROH. |
| | | RAMol from reaction of 6-chloro-3-pyridinecarbinol with (S)-3-chloro-1-phenyl-1-propanol, then base and poly(4-chloromethyl)vinylbenzene | |
| 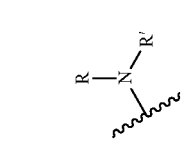 | 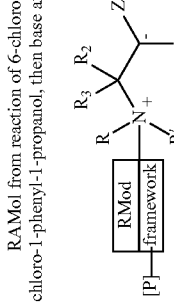 | 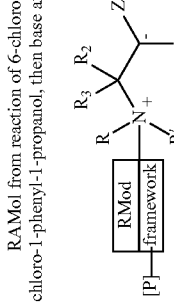 OR  | Neutral adduct formed when R = H. Z is anion stabilizing group, e.g., carbonyl, nitro sulfonyl, etc. |

TABLE 5-continued
| Reactive Functional Group | Target | Reactive Affinity Molecule - Target Adduct | Notes |
|---|---|---|---|
| specific example: 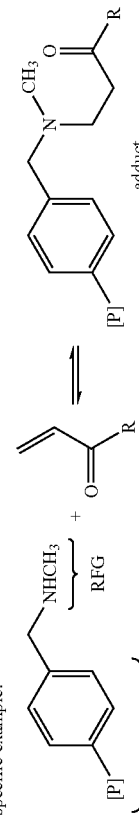 | 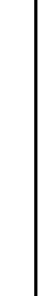 | 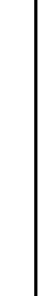 | RAMol derived from poly(4-chloromethyl)vinylbenzene and methylamine. Separation facilitated by addition of external alkylamine base. |

Reactivity Modifying Group (RMod)

The RMod is a group that is capable of modifying the equilibrium constant, K, for the reactivity of at least one RFG with at least one target, and hence the affinity that the RAMol exhibits for the target. In one embodiment, the RAMol comprises at least one RMod, such as, for example, at least two RMods. In one embodiment, the RMod comprises at least one acidic group chosen from carboxylic acids, phenols, ammoniums, phosphates, phosphate esters, phosphonates, and phosphonate esters. In another embodiment, the RMod comprises at least one basic group chosen from amines, caboxylates, phenolates, phosphate anions, and phosphonate anions. The RMod, may also be chosen from electron withdrawing groups and electron donating groups. For example, the RMod may alter at least one property of the at least one reactive functional group chosen from electronic characteristics, steric availability, and chirality.

Though not essential to the operation of the invention, the RMod may be used in a number of fashions. In one embodiment, the reactive affinity of the RAMol can be "tuned" to distinguish between different members of a given target class. For example, if two or more compounds of the target class having different electronic characteristics or steric characteristics in the vicinity of their reactive portions are present in a sample mixture, it is quite likely that these differences will lead to different degrees of association with the RAMol, i.e. different values of K and affinity. The difference in affinities might be subtle or quite large. If it were desirable to perform a group separation, that is, a separation of all of the members of the target class from the bulk of the sample, then a RAMol would be chosen that incorporated an RMod that imparted a very high value of K for the reaction of the RFG with the members of the target class. In consequence, all of the target class would undergo reaction to a large extent and be retained as a group.

In another embodiment, at least one RMod may be of use in separations of two or more members of the target class. It may, for example, be the case that only a very reactive member of a target class is the target of interest in a separation. In this situation, the RMod might be chosen so as to decrease the reactivity of the RFG, so that the less reactive members of the target group do not react significantly in the time course of the separation, and are thus washed through with other interferents/impurities. Alternatively, if a mixture containing primarily two or more members of the target class were applied in which at least one target of interest were unreactive, a highly reactive RFG might be chosen to retain the unwanted target class members, allowing at least one target of interest to pass through the column nearly unretained.

In one embodiment, a RMod may be used for the separation of enantiomers or diastereomers. Utilization of one or more RMod groups that impart chirality to RAMol in such a way that there is a favorable or energy neutral interaction with at least one desired stereoisomer of at least one target, while there is an energy neutral or unfavorable interaction with the undesired stereoisomer(s), may lead to the separation of at least one desired stereoisomer from the undesired stereoisomer(s). Separations of this type may, for example, be applicable for substances having biological or medicinal importance.

Yet another role of the RMod may be to modify reactivity of the RFG to adjust the retention time on the basis of the concentration of a target in a sample mixture. While an equilibrium constant, K, is defined by the thermodynamics of a chemical reaction, the proportion of at least one target that exists as an adduct will of course depend on the absolute concentration. While in most instances it will probably be desirable to apply solutions containing at least one target in high concentrations, there may be circumstances in which this is undesirable or inconvenient. Since from the form of the affinity reaction, target(s)+RAMol→adduct, it is clear that the proportion of adduct at any given instant will be related to the absolute concentration, and a dilute solution will be less strongly retained than a concentrated solution. Thus, it may be convenient to adjust retention on the basis of sample concentration to achieve a desirable level of retention.

In one embodiment, the RMod would be chosen so that it could modify the reactivity of RFG in a variable fashion through changes in the eluant or reaction medium. For example, this may result in a chromatographic method in which the affinity of the stationary phase could be "switched" from high to low. A sample composition, for example, may be loaded with the RAMol in a condition of high affinity for at least one target. After all interfering substances had been removed, the RAMol would be changed in such a way that the affinity for the target was drastically reduced. This would result in the release of the target without the necessity of using large amounts of eluent. This embodiment of the invention is described in greater detail below.

Phase Separating Group, [P]

The phase separating group, [P], is closely associated with the RAMol, for example, through at least one method chosen from covalent bond, chemisorption and ion-paring. The characteristics of [P] are such that, for example, it and the RAMol will occupy a different phase than a sample composition containing interferents/impurities at some point in the separation. For example, the at least one phase separating group of the invention may be a solid, such as a solid chosen from polymers, silicas, silica gels, aluminas, and carbon. Polymers, include, but are not limited to synthetic polymers and natural polymers. Polymers, for example, may be chosen from macroreticular polymers, polyethers, polyamides, polyesters and polyenes. Polyenes may, for example, be chosen from polyacrylates, macroreticular polyacrylates, polystyrenes, and macroreticular polystyrenes.

In one embodiment, [P] is a stationary phase of a chromatographic column. In another embodiment, the phase separating group may, for example, comprises at least one group that imparts solubility in a liquid, such as a water solubilizing group. Water solubilizing groups, include, but are not limited to, neutral groups, groups comprising at least one negative charge, groups comprising at least one positive charge, and groups comprising at least one negative charge and at least one positive charge. Examples of water solubilizing groups include sulfates, sulfonates, phosphates, phosphonates, carboxylates, ammoniums, phophoniums, sulfoniums, polyhydridic alcohols, guanadiniums and polyethers. The phase separating group, may also comprise at least one group that imparts solubility in a water immiscible phase.

In one embodiment, the reactive affinity molecule comprises at least one group of formula

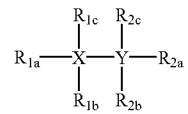

wherein $R1_a$, $R1_b$, $R1_c$ $R2_a$, $R2_b$ and $R2_c$ are each independently absent or are chosen from H, alkyl groups, aryl groups, heteroaryl groups, framework groups, reactivity modifier groups, framework groups with reactivity modifier groups, a direct bond between X and Y, and a direct bond to a phase separating group;

wherein X and Y are each independently chosen from C, O, N, and S, and wherein at least one of X and Y may have at least one positive or at least one negative charge;

and optionally wherein at least one of X and Y is bonded to at least one phase separating group. Of course, one of skill of the art will be able to determine which of these groups are chemically feasible. For example, the reactive affinity molecule may comprises at least one group chosen from $R1_a(R1_b)C=C(R2_a)R2_b$, $R1_a(R1_b)C=O$, $R1_a(R1_b)C=N-R2_a$, and $R1_a-N=O$.

In another embodiment, the reactive affinity molecule comprises at least one group of formula

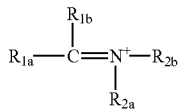

wherein $R1_a$, $R1_b$, $R2_a$, and $R2_b$ are each independently chosen from H, alkyl groups, aryl groups, heteroaryl groups, framework groups, reactivity modifier groups, framework groups with reactivity modifier groups and a direct bond to a phase separating group;

or wherein $R1_a(R1_b)C=N^+(R2_a)R2_b$ form a ring structure;

and wherein C is optionally bonded to at least one phase separating group.

Another example of a reactive affinity molecule may comprise at least one group of formula

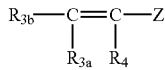

wherein $R3_a$, $R3_b$ and R4 are each independently chosen from H, alkyl groups, aryl groups, heteroaryl groups, framework groups, reactivity modifier groups, framework groups with reactivity modifier groups and a direct bond to at least one phase separating group; and wherein Z is an anion stabilizing group.

Z, for example, may be chosen from nitro groups, ketones, esters, amides, sulfoxides, sulfones, nitriles, iminiums and phosphoniums.

A further example of a reactive affinity molecule may comprises at least one group of formula

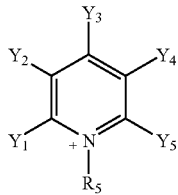

wherein R5 is chosen from H, alkyl groups, aryl groups, heteroaryl groups, framework groups, reactivity modifier groups, framework groups with reactivity modifier groups and a direct bond to at least one phase separating group; and wherein Y1, Y2, Y3, Y4, and Y5 are each independently chosen from H, alkyl groups, aryl groups, heteroaryl groups, framework groups, reactivity modifier groups, framework groups with reactivity modifier groups and a direct bond to at least one phase separating group.

For example, a method for isolating thebaine from a sample composition may comprise contacting the sample composition with at least one reactive affinity molecule that is chosen from:

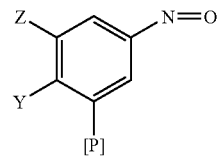

wherein Z and Y are each independently chosen from H, alkyl groups, aryl groups, heteroaryl groups, framework groups, reactivity modifier groups, and framework groups with reactivity modifier groups; and wherein [P] is a phase separating group. The positions of Z, Y, and [P] on the ring may, of course, vary. Examples of targets for use with these reactive affinity molecules, include 1,3 dienes, such as ergosterol, thebaine, and vitamin D.

In one embodiment of the invention, which is a form of liquid-solid chromatography, a RAMol covalently attached to a phase separating group that is a polymeric solid support constitutes a stationary phase that is placed inside a column. A sample composition containing one or more members of a target class of compounds is then applied, such as, for example, in the form of a solution in an appropriate solvent. This step constitutes the loading of the sample on the column. Appropriate solvents may be those that are capable of dissolving targets and interferents/impurities. An eluant may then passed through the column. In one embodiment, the eluant will be the same as the loading solvent. In another embodiment, the eluant is different from the loading solvent and may change the equilibrium constant of the reaction between the RAMol and at least one target. In another embodiment, the eluant may have similar characteristics to the loading solvent in terms of its ability to dissolve targets and interferents/impurities.

In this example, as an eluant is passed through the column, interferents/impurities will be unretained or minimally retained as a consequence of weak non-covalent interactions with the RAMol and/or polymer support. At least one target of the target class will be much more strongly retained because it may undergo a naturally reversible reaction with the RAMol. Each time this reaction occurs to give an adduct, the progress of the target through the column will be halted as it becomes physically attached through at least one covalent bond to the stationary phase. When the reaction reverses itself, the target will return to the mobile eluant phase and resume travel through the column until it reacts again with a RAMol, becomes momentarily stationary, dissociates through reversal of the reaction, and continues through the column. As this process repeats itself numerous times, the target will become separated from the those substances that are not capable of undergoing the chemical reaction. In other words, the substances that are unable to undergo the reaction will flow through at a rate similar to the eluent, but at least one target of the target class will be retained in a fashion that is dependent on the equilibrium constant, K, for formation of the adduct.

In one embodiment, in which there is more than one target in the target class present in a sample composition, it is likely that separation of these members will occur on the basis of the differing affinities that the targets have for the RAMol. This discrimination may be associated with differing values of the equilibrium constants for formation of different adducts from different reacting targets that are a consequence of differences in structures. In one embodiment, it may be possible to modify this discrimination by altering the identity of at least one RMod. It may also be possible to modify this discrimination by incorporating one or more groups onto the framework group in the vicinity of the RFG that enhance or detract from the reactivity with a given target.

In one example of the invention, the reversible nature of the reaction of the methods of the invention may, for example, result in a RAMol based stationary phase that will be reusable to some degree. For example, two or more consecutive separations may be performed using the same stationary phase, though intermediate rinsing of the stationary phase may desirable in some instances.

Alternative Combinations of Stationary and Mobile Phases

The embodiment of the invention described above constitutes a form of liquid-solid chromatography. Alternative embodiments of this invention may take advantage of the same reaction selectivity as a source of selective affinity for at least one target, but may be utilized in gas-liquid, gas-solid, or liquid-liquid chromatography.

In one embodiment, little change needs to be made to perform the invention as described above. For example, in gas-liquid or gas-solid embodiments, the principle difference being that instead of eluting with a liquid, the eluant would be a gas that would be passed through the stationary solid or liquid phase that incorporates the RAMol.

In one liquid-liquid chromatographic embodiment of invention, the RAMol may not be attached to a polymeric support, though this might also be possible. Instead, the RAMol may, for example, be attached to a group that localizes it in a liquid phase that is distinct from the liquid phase that interferents/impurities in a sample are likely to occupy. For example, if one has a sample composed of largely water insoluble or poorly soluble substances, then the RAMol might incorporate a water solubilizing group as the phase separation group. The RAMol incorporating a water solubilizing group, in conjunction with an aqueous solution, constitutes a stationary phase analogous to the solid support described above.

In the example given, in which a water solubilizing group is attached to the RAMol, separation of at least one target may be accomplished by passing a water immiscible solution of the sample composition through an aqueous solution of the RAMol in the same fashion that droplet countercurrent chromatography (DCC) is performed. Reaction of at least one target with the RAMol will now give at least one adduct that is water soluble, while the non-reacting interferents/impurities will remain soluble in the water immiscible solvent. Separation of at least one target from the interferents/impurities may occur in the same fashion as for the preferred liquid-solid embodiment described above.

Also, for example, the water immiscible sample solution may be shaken, stirred, or otherwise mixed with an aqueous phase containing the RAMol and the two phases then allowed to separate. Following physical separation of the two phases, the aqueous phase containing the adduct and any unreacted RAMol can be repeatedly or continuously extracted with a water immiscible solvent, thereby capturing free target released as a consequence of the reverse reaction. This latter embodiment may be used in conjunction with the alternative embodiments described below for enhanced recovery rates.

It should be clear from the discussion above that these methods may be employed in the reverse fashion without substantial change. That is, if at least one water soluble target is present in a sample containing water soluble interferents/impurities, then separation may be achieved by incorporating a group into the RAMol that imparts solubility in a water immiscible solvent. In this case, it will be the water immiscible solvent containing the RAMol that constitutes the stationary phase, while an aqueous solution will constitute the mobile phase.

Alternative Embodiments for Enhanced Recovery Rates

The embodiments described above for liquid-solid, liquid-liquid, gas-liquid and gas-solid variants of the invention all rely on the reversible nature of the naturally reversible reaction chosen as the basis of the affinity for the RAMol. In one embodiment of these cases, as described, at least one target is recovered by simply passing a mobile phase, e.g., eluant, through the stationary phase. In some cases this method may require the use of larger volumes of eluant than may be desirable. Two alternative embodiments (Thermal Release and Affinity Modification) of the invention may increase the rate at which target may be recovered. These two alternatives may, for example, be used separately, sequentially or in conjunction with one another. In addition to savings associated with decreased separation times (allowing greater throughput), expected decreases in the volume of eluant necessary (with associated decreases in materials costs) may make the economic advantages of these methods attractive in some cases.

Enhanced Recovery Rates Through Thermal Release

From a chemical standpoint, the reverse reaction that releases a target from an adduct is of the form:

$$\text{Adduct} \rightarrow \text{Target} + \text{RAMol}$$

In this reaction, for example, one molecule is transformed to two. It is well known that reactions of this type show an extremely large positive entropy. According to the fundamental equation of chemical thermodynamics $$\Delta G = \Delta H - T\Delta S$$

in which $\Delta G$ is the change in free energy (negative values indicating favorable energetic changes), $\Delta H$ is the change in enthalpy (usually associated primarily with making or breaking bonds), T is the temperature, and $\Delta S$ is the change in entropy. From this equation, one may predict that dissociation of an adduct will be favored at higher temperatures. That is, a large positive value of $\Delta S$ will mean that the $-T\Delta S$ term will make a larger negative contribution to $\Delta G$ as the temperature is increased. As a consequence, it will be possible to adjust the affinity of a RAMol for a target by simply changing the temperature. The temperature may, for example, be changed before reaction of the RAMol and the target or after formation of the adduct. Increases in temperature may decrease the affinity of the RAMol for target and lead to an enhanced release of target from the adduct as compared to the release at lower temperatures.

In one embodiment of the thermal release variant of the invention, a sample will be applied as previously described to a stationary phase (RAMol and phase separating group that can be liquid or solid) at some temperature, most likely ambient temperature or lower. The affinity of the RAMol, for example, may have been adjusted by judicious choice of the RMod and/or framework to give a very high affinity for at least one target; that is, K for the reaction will be quite large, and at least one target will be strongly retained. After washing or eluting away the unreacted (and hence, unretained) interferents/impurities with eluent, the temperature of the eluting solvent may be raised, either slowly or rapidly. This may be accomplished, for example, by utilizing an eluting solvent that has been heated prior to application to the column, or by heating the column itself, or by a combination of these two methods. This will greatly decrease the affinity of the RAMol for at least one target (that is, K will be greatly decreased), resulting in a release of at least one target into a smaller volume of eluent than may have been employed if the temperature had remained constant.

Enhanced Recovery Rates Through Affinity Modification

In some instances, it may be possible to make a simple change to the reaction medium and/or eluant that results in a change in the affinity of the RAMol for at least one target. In one embodiment, a change in pH will result in a change in the RFG or in RMod or framework that will in turn influence the reactivity of the RFG, and hence the affinity of the RAMol for at least one target. For example, if the RMod is a functional group that can act as an acid (e.g., a carboxylic acid, phenol, ammonium or substituted ammonium, phosphate or phosphate ester, phosphonate or phosphonate ester, or other groups of similar characteristics), then starting at an appropriate pH, an increase in pH will result in the change in the charge state of the group from neutral to negative (in the case of carboxylic acids, phenols, phosphate or phosphate esters, phosphonate or phosphonate esters), or from positive to neutral (in the case of ammonium or substituted ammonium). This change in charge state may result in a corresponding increase in electron density on the RFG that may greatly influence the reactivity characteristics of the RFG, such as through inductive or resonance effects, leading to an increase or decrease in the affinity of the RAMol for at least one target, depending on the particular naturally reversible reaction that serves as the basis of the affinity.

Similar effects can be obtained, for example, by incorporation of a RMod having basic properties (e.g., amine or substituted amine, carboxylate, phenolate, phosphate or substituted phosphate anion, phosphonate or substituted phosphonate anion). In this case, a decrease in the pH of the medium from an appropriate starting pH results in protonation of the base and a corresponding decrease in the electron density of the RMod that may influence the reactivity of the RFG, and thus modify the affinity of the RAMol for at least one target. A further means of accomplishing the same effect would involve incorporating the acidic or basic group as part of the framework. For example, a pyridine or other nitrogen heterocycle framework having a RFG would change its electronic effects on the RFG upon protonation of the nitrogen.

Consider, for example, the case of a RAMol in which the RFG is attached to a benzene ring framework with a phenol para to the RFG, and that the characteristics of the affinity reaction are such that it is favored by a decrease in electron density at the RFG. If the sample is loaded onto a stationary phase at a pH such that the phenol is neutral, then the RAMol will exhibit some characteristic affinity for a target. In one embodiment, the RAMol will have been designed (through addition of additional RMods, if necessary) to have a high affinity for a target under these conditions, so a target will be very strongly retained. It will then be possible to pass eluent through the stationary phase to remove interferents/impurities without eluting target. Once the interferents/impurities have been removed, the pH of the reaction medium or eluant will be increased to a level at which the phenol is converted to a phenolate, with an attendant increase in electron donation properties. This change in donor properties will decrease the affinity of the RAMol for target, leading to its release from the stationary phase. In one embodiment, it may then be possible to elute target rapidly with a small volume of eluent.

The example just given utilizes a change in charge state from neutral to negative to modify the affinity of the RFG. Similar effects may be achieved through a positive to neutral change in the charge state. If the para phenol group in the example above is changed to a para amino group, at an appropriately low pH this will exist as an ammonium group and be strongly electron withdrawing. Under these circumstances (for the reaction type specified) the affinity of the RAMol for target will be high. Increasing the pH to a value at which the ammonium loses a proton to become a neutral amine will then increase the electron donating properties of the RMod, resulting in the release of the target from the stationary phase.

The overall effect of embodiments, such as those described above may be termed "switchable" affinity of the RAMol for a target. By manipulating the pH of the reaction medium or eluant it may be possible to modify the affinity of the RAMol (and thus, for example, the stationary phase) for the target. In general, this means that some embodiments of the invention may be performed by loading the sample when the RAMol is in a high affinity condition, eluting away interferents/impurities, and then switching the RAMol to a low affinity state through changing the pH.

Though in the examples given above the atom of the RMod undergoing change in charge state was directly attached to an aromatic ring, that was in turn directly attached to the RFG, the atoms undergoing the changes in charge state may be more remote (e.g., with one or more atoms, possibly carbons, in between the atom and the framework). Furthermore, while the placement of the RMod cited was para in an aromatic ring, other positions are possible. Additionally, as described above, frameworks that are not aromatic rings may also be employed. Further, though in the example given above it was assumed that the affinity of RAMol was increased by decreases in electron density at the RFG, the opposite may also be the case. In these circumstances, for example, affinity would be decreased by changing the characteristics of the RMod from more electron donating to less electron donating.

In the example given above the affinity of RAMol was "switched" through a change in pH that influenced the characteristics of the RMod, such a change in pH could also act directly at the RFG, or on the target portion of the adduct. Affinity of a RAMol for at least one target may also be influenced by other factors. For example, changing solvent polarity might increase or decrease affinity through changes in solvation of the adduct vs. RAMol plus target. In one embodiment, a RMod application may allow one to distinguish between an electron rich/sterically unhindered diene vs. an electron poor/sterically hindered diene.

Application of the Separation Method as a Batch Process

In some cases it may be desirable to operate the invention as a batch process, instead of a chromatographic process. In one application, for example, a sample may be combined in a reaction medium with a RAMol that has been attached to a solid support. After waiting a suitable time for the affinity reaction to take place to give a solid support bound adduct, the reaction medium would be removed, for example, through filtration, decantation, or pumping. This excess reaction medium will contain those species incapable of undergoing the naturally reversible reaction. The solid support bound adduct will then be extracted repeatedly with, for example, an eluant or a second reaction medium to recover target as they are released from the adduct.

One embodiment would also employ at least one of thermal release and affinity modification to decrease the number of extractions necessary to recover target. In yet another alternative embodiment of this variant of the method, a solution of a substance that has a much higher affinity for the RAMol than target would be added after the removal of the solvent containing interferents/impurities. Such a compound may be termed a displacement agent. As target is released into solution, they will be replaced by displacement agent. Decantation or other removal of the solvent will give target in solution with displacement agent remaining behind in the form of an adduct with the RAMol.

It should be clear that the alternative embodiments described herein could be used separately, or in combination with each other.

EXAMPLES

Example 1

Specific Application: s-cis-1,3-diene Purification through Reversible Cycloaddition Reactions Background for s-cis-1,3-diene Purification A diene is a compound that contains two carbon-carbon double bonds anywhere in its structural framework. If the two double bonds are attached to one another (but are not part of an aromatic ring) to give the substructure C=C—C=C, this grouping is referred to as a conjugated, or 1,3-diene. In some cases one may make a further distinction between 1,3-dienes that relates to their conformation; that is, how the two carbon-carbon double bonds are oriented in space with relation to each other. Specifically, a 1,3-diene may be s-cis or s-trans (FIG. 2), with the latter conformer generally predominating. Furthermore, the degree to which the diene exists in one of these conformations may be greatly influenced by structural factors. For example, while diene 1a (R=H, R'=$CH_3$) exists to an appreciable extent in the s-cis conformation, diene 1b (R=$CH_3$, R'=H) exists almost entirely in the s-trans conformation due to steric hindrance between the $CH_3$ group and the other alkene. In some compounds the 1,3-diene may be locked into either an s-cis conformation (as for compound 2a) or s-trans conformation (as for compounds 2b and 2c).

Figure 2:
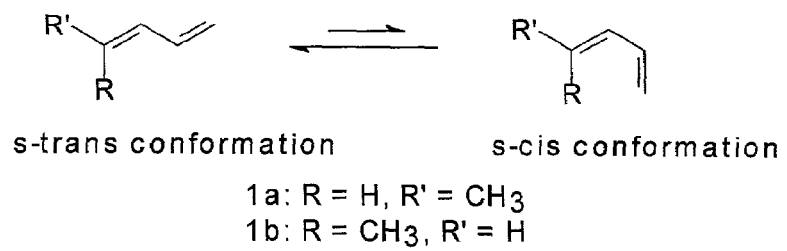
FIG. 2. Conformations of 1,3-dienes and examples of pharmaceutically important s-cis-1,3-dienes. The proportion of s-cis diene is much less in the case of 1b than for 1a. The diene in 2a is locked in an s-cis conformation, while those of 2b and 2c are locked in s-trans conformations. Pharmaceutically important 1,3-dienes locked in an s-cis geometry include, but are not limited to, thebaine, ergosterol and vitamin $D_2$.
Figure 2:
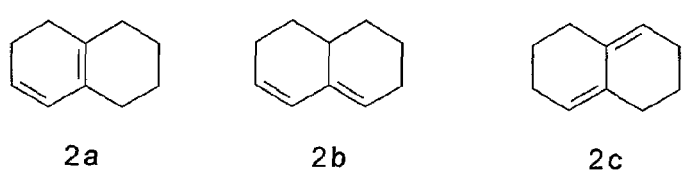
Figure 2:
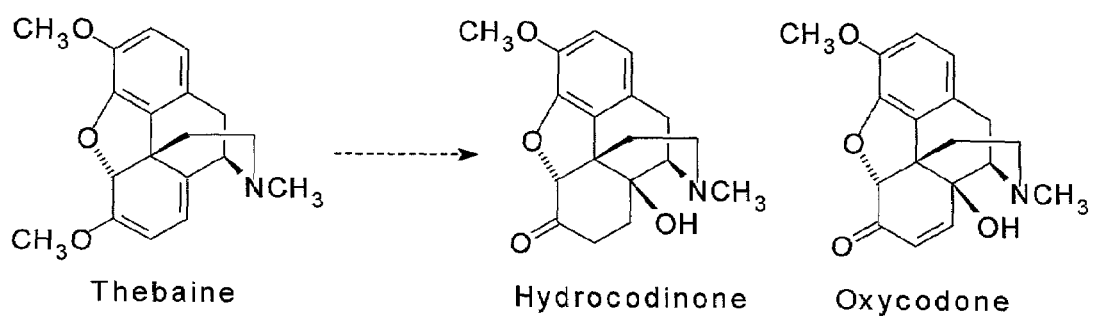
Figure 2:
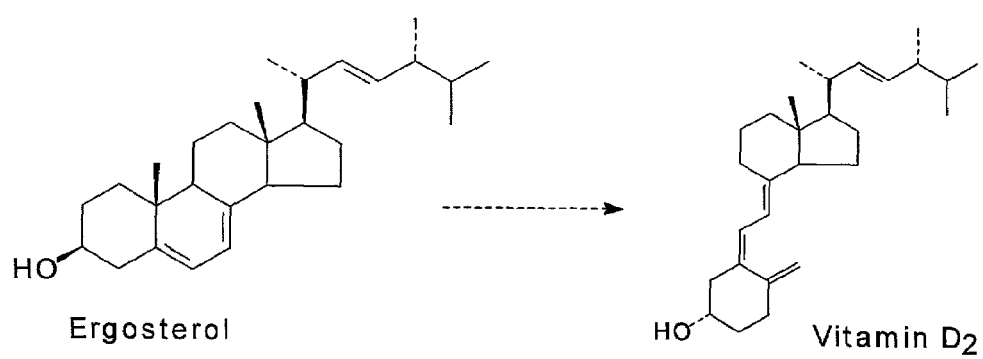

Thebaine is a 1,3-diene of practical importance in medicinal chemistry in which the diene subunit is locked into an s-cis geometry (FIG. 2). Thebaine is a constituent of opium, typically present at concentrations of about 0.2 to 0.8%, though this value may be on the order of 3% in some varieties of opium. While thebaine itself is not typically used as a pharmaceutical, it is of considerable economic importance because it serves as an excellent starting material for the preparation of hydrocodone (hydrocodinone) and oxycodone (FIG. 2), both of which are commonly prescribed pain relievers. It is usually the case that thebaine is isolated from an opium extract after morphine and codeine have been removed by other means. While a number of methods have been used to purify thebaine from these extracts, some of the methods are generally quite time consuming if they are performed so as to obtain the maximum yield of thebaine at a satisfactory level of purity for subsequent conversion to other compounds. For this reason, the acquisition of sufficiently pure thebaine from opium may be considered the most difficult and expensive aspect in the preparation of hydrocodone and oxycodone.

Another pharmaceutically important 1,3-diene that is locked into an s-cis geometry is ergosterol. Irradiation of ergosterol with UV light leads to the formation of Vitamin D2, which is itself a s-cis-1,3-diene (incorporated as part of a triene, FIG. 2). Ergosterol is isolated from yeast extracts, and it is its isolation and purification that poses the primary difficulty in the production of Vitamin $D_2$. Along with vitamins $D_2$, vitamins $D_1$ and $D_3$ are also examples of s-cis dienes that have considerable nutritional importance.

Figure 3:
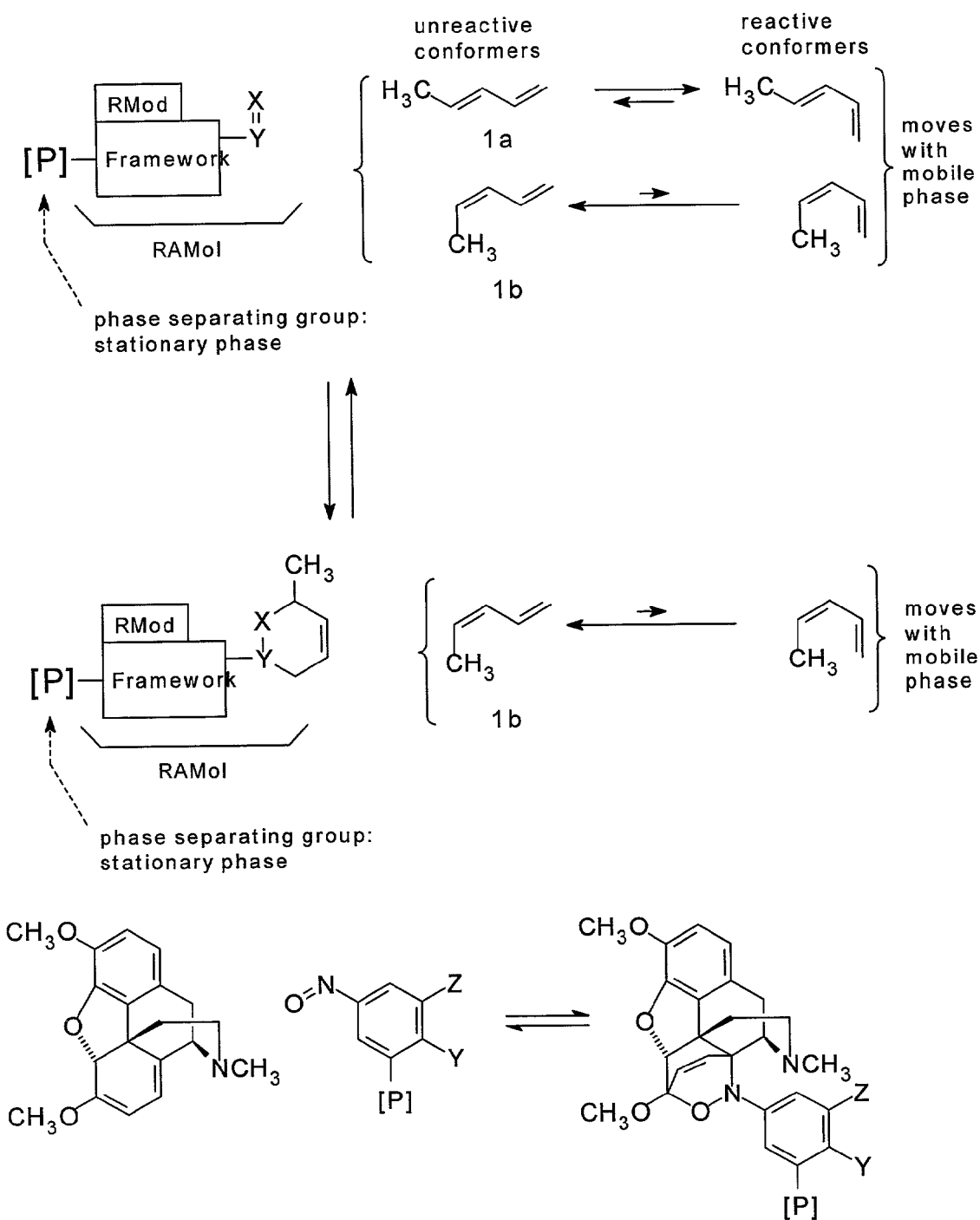
FIG. 3. Example of the application of RAC to the separation of dienes. The top portion of the figure illustrates one example of the selectivity that may be expected in the separation of dienes having varying propensities for adopting reactive s-cis, vs. unreactive s-trans geometries. The bottom portion of the Figure shows a more specific embodiment of the method, in which the RFG is a nitroso group capable of reacting with the fixed s-cis diene of thebaine. The groups Y and Z are RMod groups.

An embodiment of the invention that may be used to purify 1,3-dienes that are capable of adopting the s-cis conformation utilizes a reversible 4+2 cycloaddition reaction as the affinity based reaction. An example is illustrated in FIG. 3, with substituted butadienes 1a and 1b. A 4+2 cycloaddition reaction most commonly involves a diene reacting with what is termed a dienophile, i.e., diene loving. When the dienophile is an appropriately substituted carbon-carbon double or triple bond the 4+2 cycloaddition is the well known Diels-Alder reaction. However, other doubly or triply bonded atoms may also undergo the 4+2 cycloaddition reaction.

In one embodiment, the choice of a 4+2 cycloaddition reaction as an affinity reaction utilizing reaction with a 1,3-diene requires that the diene have a s-cis-1,3 geometry. A diene that, for whatever reason, has a strong preference to maintain an s-trans geometry over an s-cis geometry may not react as easily, and may therefore be less strongly retained in the RAC method than a 1,3-diene that has a higher percentage of s-cis diene. Thus, to return to the example of compounds 1a and 1b, the former would be expected to be more strongly retained than the latter, i.e. elute more slowly, since it would spend more time as the stationary Diels-Alder adduct.

Dienes that are locked in an s-trans conformation will not react at all by the 4+2 cycloaddition reaction and will not be retained by this example to a substantially different degree than any non-diene substance. Thus, in some applications, the methods of the present invention may provide an advantage over traditional chromatography. For example, the separation of compounds 2a–c using traditional chromatographic methods would be quite difficult. The compounds are isomeric, with the same size and disposition of ring systems, and all possess 1,3-dienes that will have similar non-covalent interactions with a solid support. As a consequence of these subtle distinctions it is expected that the compounds will show very similar mobilities using conventional chromatographies. In contrast, since compound 2a is capable of undergoing a naturally reversible reaction with the RAMol described above, while compounds 2b–c are not, the former may be strongly retained using this example, while the latter compounds will be no more retained than other interferents/impurities.

Example 2

Description of the 1,3-diene Purification Variant of the RAC Invention

In one embodiment of this invention the reactive functional group of the RAMol undergoing cycloaddition reactions with dienes is a nitroso (FIG. 3, bottom). A nitroso group may be useful because it is known to exhibit a high level of reversibility in cycloaddition reactions with dienes, and because the extent of reversibility can be influenced by substituents on the benzene ring of aryl nitroso compounds. Other RFGs, useful in this example include, but are not limited to N=N, N=S, C=C, C=O, C=N, C=S or C≡C groups, as the dienophilic components in the cycloaddition reaction. In addition, it is possible to employ cycloadditions other than 4+2 for the reversible reaction (e.g., 4+1, 4+3).

The benzene ring of the nitroso compound illustrated in FIG. 3 constitutes the framework. The group [P] represents a linkage to a phase separating group, such as a solid support, e.g., a natural or synthetic polymer. In one embodiment, the synthetic polymer is one in which has high surface area, high stability and is relatively insensitive to changes in changes solvent composition. These characteristics, may, for example, be satisfied by macroreticular polystyrene based ion exchange resins. Commercial products having appropriate characteristics are Amberlyst A-26 or Amberlite IRA-900, both manufactured by the Rohm and Haas company.

The groups Y and Z represent one or more RMods. It has been observed that the dissociation of cycloaddition adducts of dienes with aryl nitroso compounds is decreased by electron withdrawing groups and increased by electron donating groups. It should be understood that the particular placement of [P], Y, Z that is shown could be modified be one of skill in the art as appropriate to achieve the desired reactivity effects by the RMod groups.

Figure 4:
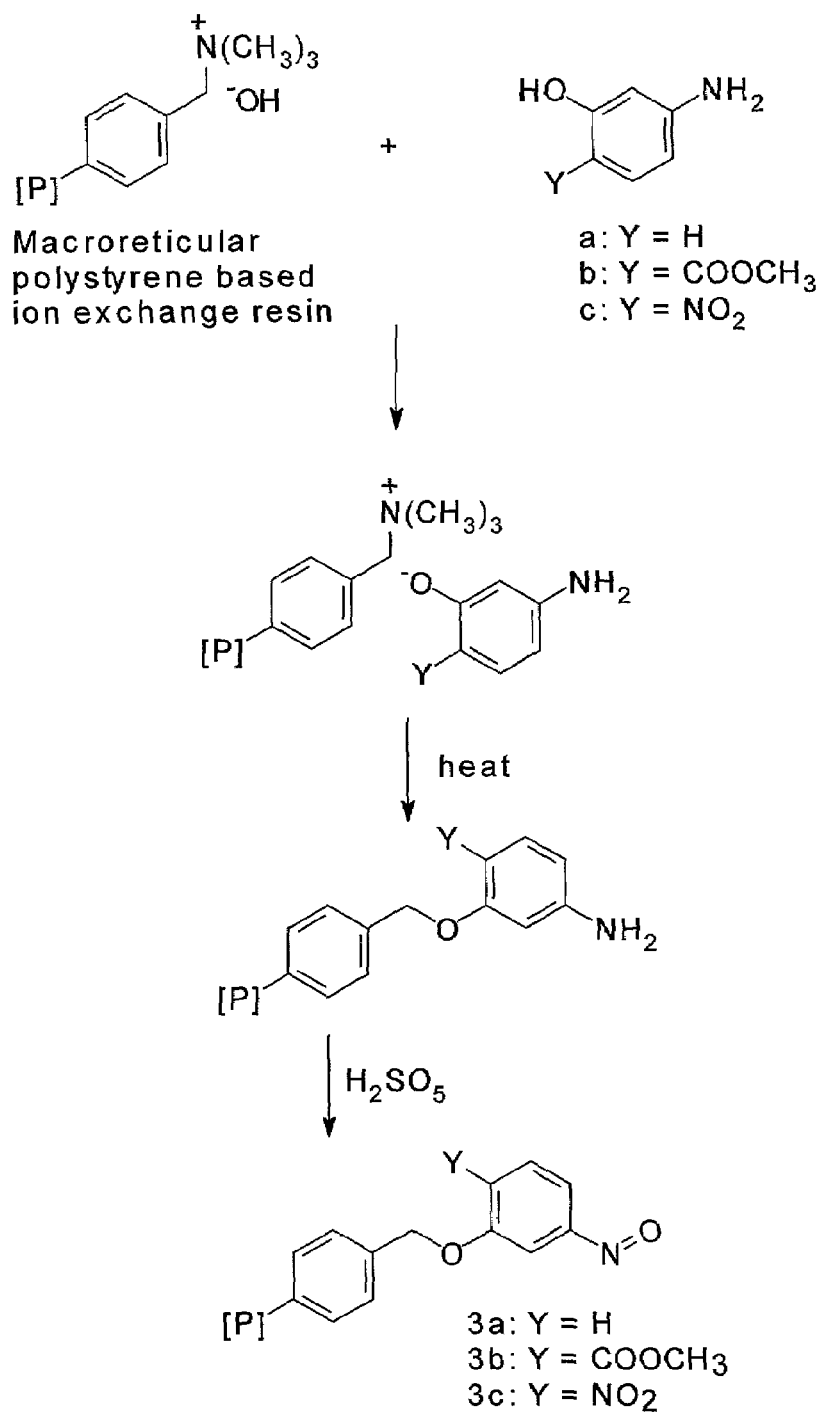
FIG. 4. Example of synthesis of RAMols having differing affinities for dienes.

An example of the preparation of set of specific RAMols is illustrated in FIG. 4 (Also see Example 6). These RAMols differ in terms of their affinities for s-cis-1,3-dienes, with compound 3a (Y=H) having the lowest affinity and compound 3c (Y=$NO_2$) having the highest affinity. The preparations are similar and straightforward, proceeding from commercially available starting materials. Thus, the hydroxide form of a macroreticular polystyrene ion exchange resin possessing benzyltrimethylammonium functionality (Amberlite7 IRA-900 is an example) is treated with methanol or other solutions of 3-aminophenol, ethyl 4-aminosalicylate (from Fisher esterification of 4-aminosalicylic acid), or 2-nitro-5-aminophenol to give the corresponding phenolate salts of the ion exchange resin. Heating directly or replacing the solvent with a nonpolar solvent such as toluene or benzene, followed by heating, results in displacement of the trimethylamine group to give the intermediates shown. Oxidation of the amines with Caro's acid ($H_2SO_5$) yields the corresponding nitroso compounds 3a–c which may serve as the RAMols.

One of skill in the art will recognize many variations on this general approach for preparing these and similar RAMols. These variations apply not only to the specific reactions performed in the sequence and the manners in which they may be performed, but also to the order in which the reactions are performed (e.g., a nitroso compound could be prepared and then attached to the polymer, rather than being formed after attachment of the amine to the polymer). It should also be understood that the covalent attachment of the framework shown could be replaced by an ionic attraction between a charged group on the RAMol and an oppositely charged group on the polymer.

Example 3

Operation of the 1,3-diene Purification Variant of the RAC Invention

One example, of the operation of this invention for the purification of thebaine from opium extracts will be as described for the general case above. It should be understood that the invention may also be applied, for example, to the purification of ergosterol present in yeast extracts or cell homogenates, and any of the Vitamin D species present in reaction mixtures or other sources having interferents/impurities, and any other 1,3-diene capable of adopting an s-cis geometry and undergoing a cycloaddition reaction. It should also be understood that though the term 1,3-diene is used, trienes, tetraenes and other polyenes are examples of members of this target class, provided that they have as some portion of their structure a 1,3-diene that is capable of adopting an s-cis geometry. Though dienes are made up of two conjugated carbon-carbon bonds, other substances in which one of the carbons has been replace by a non-carbon atom may also serve as members of the target class, provided that they are able to undergo the 4+2 cycloaddition reaction.

Since the affinity of a RAMol for a target is based on a naturally reversible reaction, and chemical reactions occur with different rates and equilibrium constants depending on the structures of the reactants, it is clear that the affinities of various s-cis dienes may vary for a given RAMol. As a consequence, for example, a RAMol that is effective for the separation of thebaine may require some modification to be effective for the separation of compounds having different structural characteristics than thebaine. In one embodiment, this modification may be accomplished by changing the identity/identities and/or position(s) of RMod groups on a framework.

Purification of a sample composition containing thebaine may be accomplished by loading it as a solution in an appropriate solvent onto a column containing the polymer bound RAMol. Appropriate solvents include, for example, those capable of dissolving thebaine, and include alcohols, ethers, aromatic hydrocarbons. Choice of loading and eluting solvent will often be dictated by whether the thermal release and/or the affinity modification variants of the invention are to be employed. When utilizing the thermal release variant it may be desired to utilize a solvent that has a conveniently high boiling point. Alcohol solvents that would be appropriate include, for example, methanol, ethanol, propanol, isopropanol and butanol. Propyl and butyl ethers may also be appropriate, as would mixed ether solvents having boiling points ranging from 40–150° C. Hydrocarbon solvents appropriate for this purpose include, for example, benzene, hexanes, heptanes, toluene, any of the xylenes or any of the mesitylenes.

When the affinity modification variant of the invention is to be employed solvents include, for example, water, methanol, ethanol and some mixture thereof. However, it may also be possible to utilize non-polar hydrocarbon solvents in appropriate circumstances. In one embodiment, the pH of the solvent will have been adjusted so as to be compatible with maintaining the charge state of the RAMol in the desired state of affinity.

After loading the thebaine in the appropriate solvent, eluent may be passed through the column to remove those compounds that do not undergo 4+2 cycloaddition reactions. It may, for example, be most convenient to choose the eluent to be the same as the loading solvent, though there may be circumstances in which it may be more convenient to change to another solvent. For example, in cases in which the thebaine is obtained through some purification process as a solution in a particular solvent, it may be desired to change to a different solvent that is more appropriate for utilization of the thermal release and affinity modification variants.

The first portions of the eluent to exit the column will contain the non-thebaine/non-1,3-s-cis diene components of the mixture, since thebaine will be retained as a consequence of the reversible 4+2 cycloaddition reaction. Continued elution will afford eluent containing thebaine. Evaporation of these portions of the eluent will afford thebaine. The reaction affinity column will then be capable of being used again for a similar separation, though in many cases it will be desirable to pass further eluent through the column, or to pass some other solvent through the column.

Description and Operation of an Example of the Thermal Release Variant of the RAC method for Diene Purification In the thermal release variant of the invention the thebaine may be loaded in a conveniently high boiling solvent, as described above. In one example, after sufficient eluent has been passed through the column so as to remove non-thebaine interferents/impurities, the temperature of the eluting solvent will be raised to a level (most likely to 60–150° C.) such that release of the thebaine will be enhanced. Instead of heating the eluting solvent it may be more convenient to heat the column containing the RAMol; alternatively, it may be more effective to heat both the column and the eluent. Utilization of this alternate embodiment should substantially increase the rate at which the thebaine may be recovered from the column, as well as decrease the volume of eluting solvent necessary.

Figure 5:
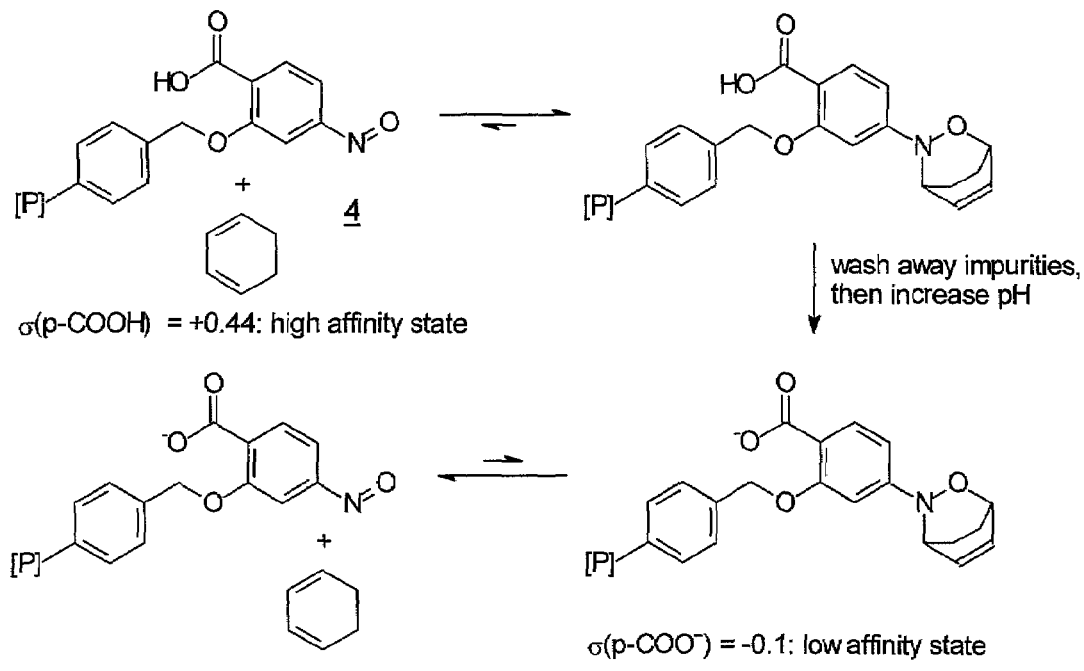
FIG. 5. Operation of two examples of affinity modification of the RAC method for diene purification.
Figure 5:
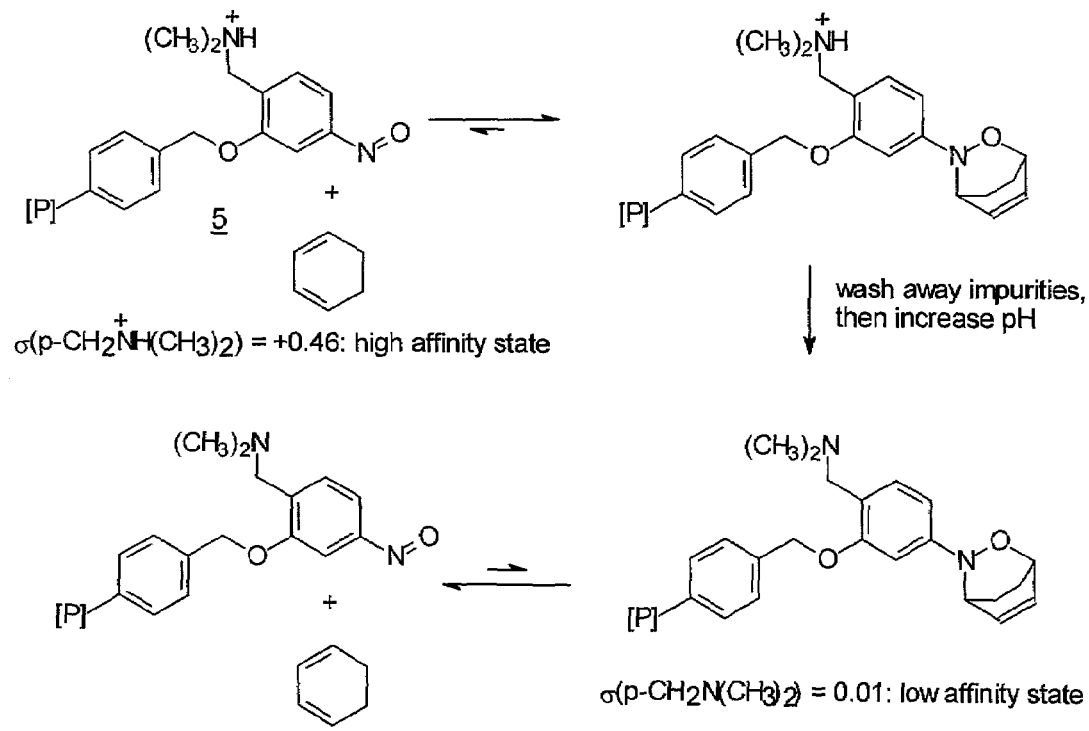
Figure 10:
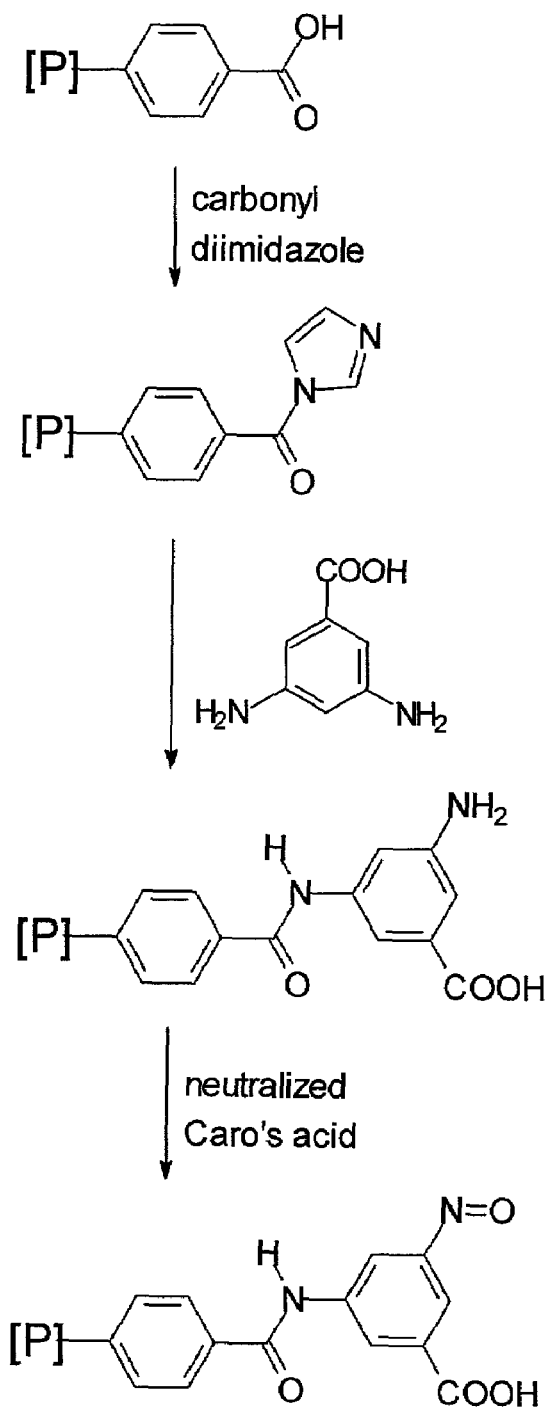
FIG. 10. Example of how to prepare an affinity resin.

Description of an Example of the Affinity Modification Variant of the RAC Method for Diene Purification Two examples of RAMols that incorporate RMods that can be used in the affinity modification variant of the invention are shown in FIG. 5 (An additional example is shown in FIG. 10). In the first example (compound 4) the affinity modification of the RAMol is accomplished by a pH change that results in a change in the RFG charge state from neutral to negative, while in the second example (compound 5) the change in charge state is from positive to neutral.

Figure 6:
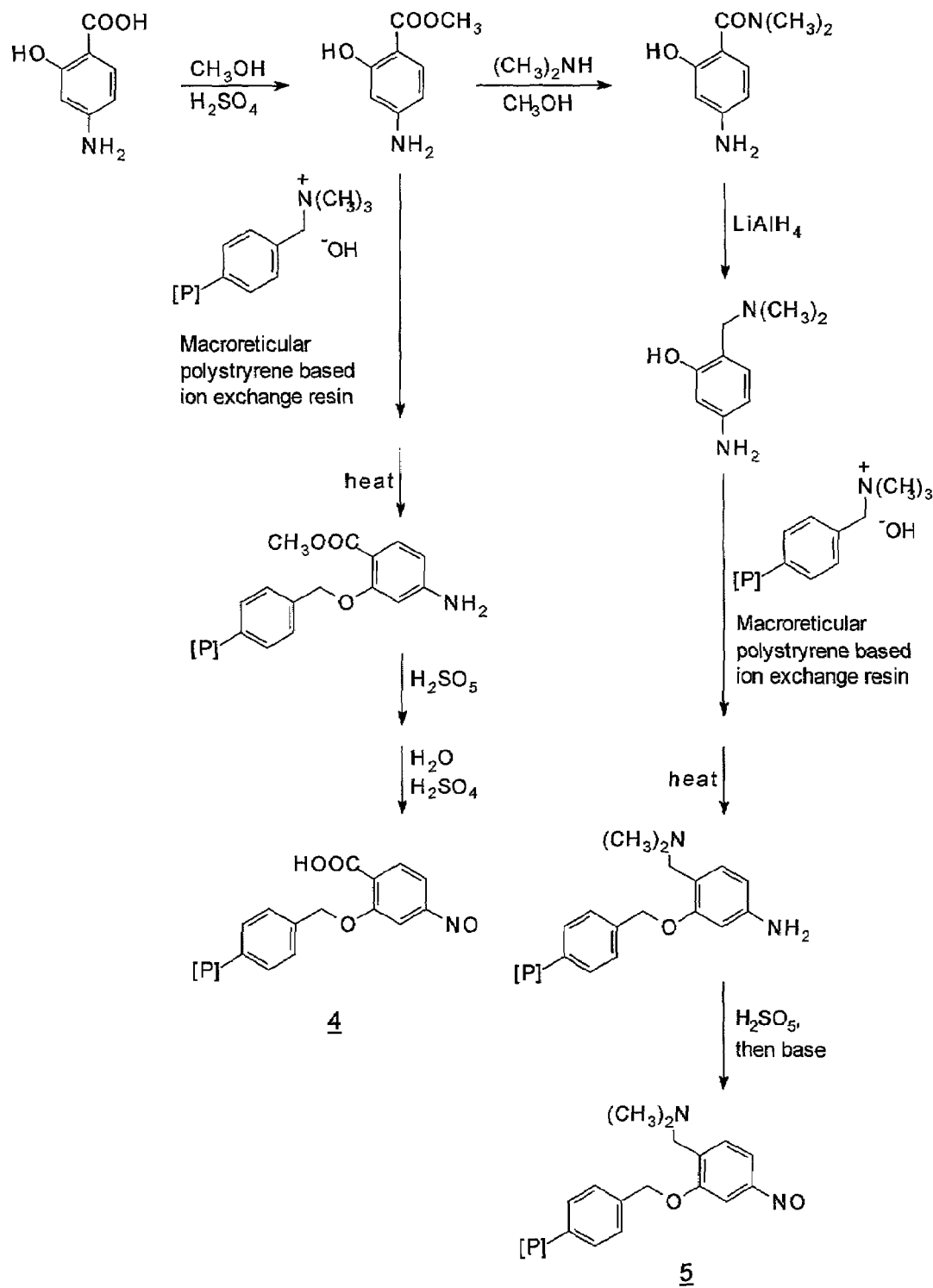
FIG. 6. Example syntheses of two RAMols that may be used in affinity modification of the RAC method for diene purification.

The preparation of these reactive affinity columns may, for example, begin with the Fisher esterification of the inexpensive and commercially available 4-amino-salicylic acid, most likely to give the methyl ester, though other esters could be used equally well (FIG. 6). For the preparation of compound 4 the methyl ester may be reacted with the basic form of a macroreticular benzyltrimethylammonium polystyrene ion exchange resin. Heating (probably, subsequent to a solvent change to toluene) will yield the polymer bound RAMol previously described, compound 3b. This may be oxidized with Caro's acid, $H_2SO_5$ to the nitroso compound. If hydrolysis of the methyl does not occur under these conditions, then the ester will be purposefully hydrolyzed with acid and water to give compound 4.

For the preparation of compound 5 the methyl 4-aminosalicylate may be converted to the dimethylamide by reaction with a solution of dimethylamine in methanol, most likely a saturated solution. It should be possible to accomplish this at room temperature under normal atmospheric pressure; however, the reaction rate could be increased by heating a pressurized vessel. Reduction by any of a number of reducing agents (e.g., lithium aluminum hydride, aluminum hydride, sodium bis-methoxyethyoxyaluminium hydride), but most likely lithium aluminum hydride, will yield the tertiary amine. This may be applied to compound 5 in a fashion similar to that for compound 5 by attachment to the macroreticular resin, followed by oxidation with Caro's acid.

Those familiar with standard techniques of organic synthesis clearly understand that the overall syntheses could be modified with out substantial change by changing the order in which some of the steps are performed (e.g., formation of the nitroso compounds prior to attachment to the resin), or by utilizing different reagents to perform the same reactions.

An example, of the operation of the invention is shown in FIG. 5 with 1,3-cyclohexadiene. Any other 1,3-diene capable of adopting an s-cis geometry would also be susceptible to purification in the same fashion. Specifically, this alternate embodiment could be applied to the purification of thebaine, ergosterol or any of the vitamin Ds.

The high and low affinity states are shown for each RAMol (FIG. 5), along with Hammet $\sigma$ values for the RMods in their various states. A less positive $\sigma$ value indicates a lesser degree of electron withdrawing ability. Since it is known that the dissociation of the 4+2 cycloaddition adducts of aryl nitroso compounds with dienes is increased by increasing electron donation by substituents, a change of a RMod $\sigma$ value from a more positive to a less positive value will result in a decrease in the affinity of the RAMol for the diene, and enhanced release of the diene. As discussed above, other groups capable of undergoing changes in charge state could also serve as RMods for the affinity modification.

Example Operation of the Affinity Modification Variant of the RAC Method for 1,3-Diene Purification The pH of a solution containing target can be adjusted, if necessary, so that the pH is compatible with maintaining the RMod in its high affinity state. In the case of compound 4 this pH would probably be less than 5, while in the case of compound 5 this pH would probably be less than 9. Loading and eluting solvents will be water, methanol or ethanol. The target containing solution will be applied to a column containing the RAMol attached to the solid support; in this example, though not necessarily, the RAMol will already exist in its high affinity state. The sample, and then eluent of a comparable pH will then be passed through the column. Because the RAMol will be in a high affinity state, target will undergo the affinity reaction and be retained strongly. After sufficient eluent has been passed through the column so as to remove interferents/impurities to the desired level, the pH of the eluent will be changed to a value that converts the RMod to its low affinity state, resulting in an enhancement in the release of the target. In the case of compound 4 this new pH will probably be greater than 7, but less than 13. In the case of compound 5 this new pH will probably be greater than 10 but less than 14. Alternatively, a different eluent will be employed that also has the effect of decreasing the affinity of RAMol for the target. Eluant flow in any of these cases will be continued until the desired amount of target is eluted from the column and collected.

While water, methanol or ethanol represent attractive solvents from the standpoint of ready pH control (and thus affinity modification) it may sometimes be the case that a target is not sufficiently soluble in these solvents to be loaded at a desirable level of concentration. Under these circumstances affinity modification may performed in a different fashion. For example, in the case of compound 4, after loading a sample in an appropriate solvent (as determined by the solubility characteristics of the target in question) and eluting with sufficient solvent to remove interferents/impurities, the eluent will be modified to include sufficient organic base (e.g., trimethylamine or triethylamine) so as to react with the carboxylic acid groups of the RAMols and make trimethylammonium carboxylate salts. This will result in the desired affinity modification and the enhanced release of the target.

In the case of compound 5, the RAMol will be converted to its high affinity form, for example, by passage of a solvent containing some acid through the column containing the RAMol. Acids that might be used for this purpose include, but are not limited to, HCl, HBr, acetic acid and acetic acid derivatives, and any acid strong enough to substantially protonate a tertiary amine. If a water immiscible solvent is used for this purpose, then the acids used may be anhydrous, or nearly so. After passage of a solution of target through the column so as to bind target as their corresponding adduct, the eluent would be changed to one that incorporated an organic base, such as trimethylamine or triethylamine. These organic bases will serve to return the RAMol to its neutral basic state having a lower affinity for the target, thereby enhancing the release of the target.

Figure 7:
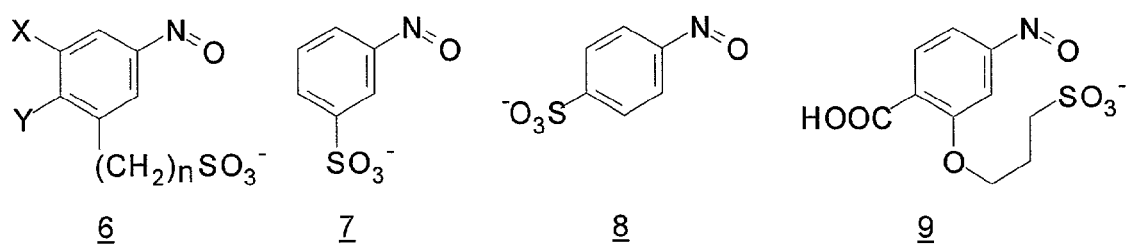
FIG. 7. Examples of RAMols useful in one liquid-liquid chromatographic embodiment of the RAC method for diene purification. Example of the synthesis of a RAMol, 9, which may be useful in the affinity modification variation of the liquid-liquid chromatographic embodiment of the RAC method for diene purification.
Figure 7:
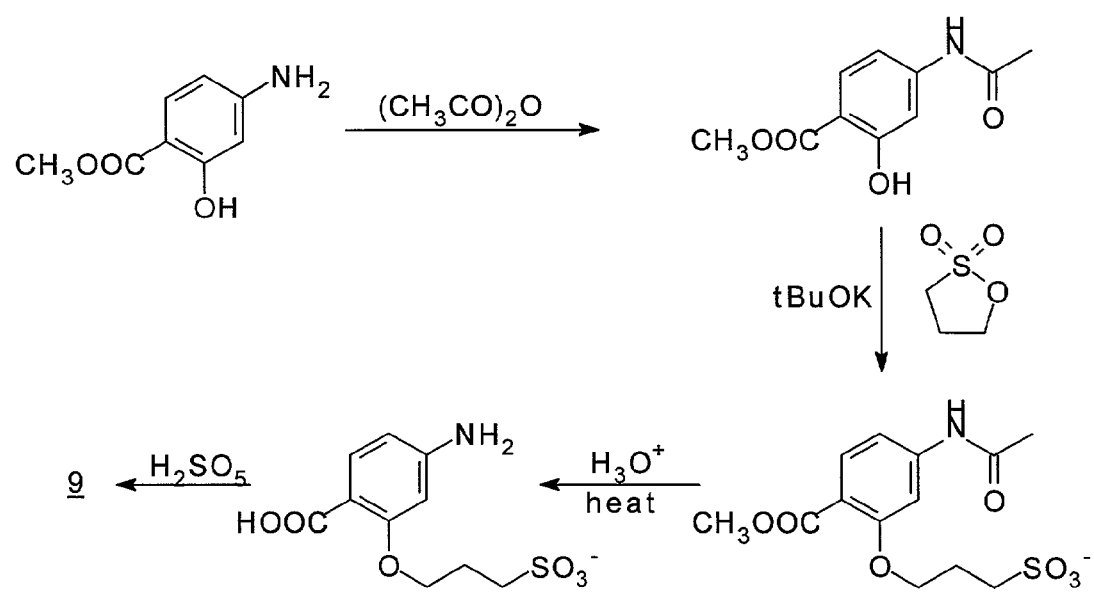

Description of an Example of a Liquid-Liquid Chromatography Variant of the RAC Method for the Purification of 1,3-Dienes An example of an embodiment of a liquid-liquid chromatography variant of the RAC method for the purification of 1,3-dienes is shown in FIG. 7. The RAMol in this embodiment is not attached to a solid support, but instead has a water solubilizing group. A generalized example of this is compound 6, in which the water solubilizing group is a negatively charged sulfonate separated from the framework by a $(CH_2)_n$ group (n=0 or larger). However, additional sulfonate groups could be employed, one or more other anionic groups could be employed, one or more cationic groups could be employed, and some neutral solubilizing group could be employed. As in the examples given above, the framework shown in this particular example is a benzene ring, but could be many other things. The groups X and Y are one or more RMod groups that may or may not be capable of being used in the affinity modification variant of the invention. The position of attachment of all of these groups may be varied in order to achieve desired levels of affinity and/or additional interaction between the RAMol and a target.

An alternate embodiment of this invention for simple separations (without the use of affinity modification) has n=0, and constitutes 3-nitrosobenzenesulfonic acid, compound 7. It could be prepared by oxidation of readily available 3-aminobenzenesulfonic acid (metanilic acid) with Caro's acid. Another example of this invention is 4-nitrosobenzenesulfonic acid, compound 8, obtainable by Caro's acid oxidation of readily available 4-aminobenzenesulfonic acid (sulfanilic acid). For the affinity modification variant of this example of liquid-liquid chromatography, an example RAMol is a nitroso carboxylic acid, such as compound 9, that additionally incorporates a water solubilizing sulfonic acid group. This compound could be prepared as illustrated in Scheme 7. The methyl (or other) ester of 4-aminosalicylic acid will be reacted with acetic anhydride, followed by alkylation of the phenolic oxygen with cheap and readily available propanesultone. Heating in concentrated acid (or base, followed by reacidification) will hydrolyze the methyl ester and amide groups. Oxidation with Caro's acid will provide the RAMol, compound 9.

Operation of an Example of the Liquid-Liquid Chromatography Variant of the RAC Method for 1,3-Diene Purification: Substantially a Single Target of the Target Class Present One embodiment of the invention, for purification when there is substantially a single target present, is to operate in what may be termed a batch mode using the affinity modification variant of the invention. In this embodiment, the pH of an aqueous solution containing the RAMol will be adjusted to a value such that the RAMol is in its high affinity state. This aqueous solution will then be stirred, shaken or otherwise intimately mixed with a water immiscible solution of the sample. The sample may have previously been extracted with water so as to remove water soluble impurities. During this mixing process the target will react with the RAMol to give an adduct and consequently become soluble in the aqueous phase by virtue of the water solubilizing group of the RAMol. After mixing, the two phases will be allow to separate and hence they will then be physically separated. The pH of the aqueous phase containing the water soluble adduct will then be adjusted to a value such that at least one RMod undergoes an affinity modification to decrease the affinity of the RAMol for the target, resulting in reverse reaction of the adduct to give free target and free RAMol. The aqueous phase will then be extracted one or more times with a water immiscible solvent, as sufficient to remove the target from the aqueous phase to a satisfactory degree. Evaporation of the combined water immiscible extracts will yield the substantially purified target. The aqueous phase containing the RAMol can then be reused for additional purifications.

In the specific example of the use of RAMol compound 9, an aqueous solution of compound 9 at a pH of less than 5 will be shaken, stirred or otherwise intimately mixed with a solution of a water immiscible diene (e.g., ergosterol) in an organic solvent, for example ether or toluene. Cycloaddition reaction will lead to an adduct that is water soluble by virtue of the presence of the sulfonate group. Impurities that do not undergo this cycloaddition reaction will remain in the organic phase and will be physically separated in this phase from the aqueous layer. The pH of the aqueous phase will then be adjusted to a value of 7 or higher, thereby converting the carboxylic acid to its carboxylate salt. This large change in electron donating effect will decrease the equilibrium constant for the formation of the adduct, thereby releasing the diene. Subsequent shaking or stirring of the aqueous phase with an organic solvent will result in its extraction into that solvent, where it may be recovered by separation and evaporation.

In some circumstances it may not be desirable to change the nature of the liquid phase containing the RAMol or the adduct. In these instances it may be more advantageous to employ the thermal release variant to achieve an enhanced recovery rate. In one embodiment of the invention, a water soluble RAMol will be employed. It is likely that the positions and identities of the RMod group(s) will be chosen so that there is a high affinity of the RAMol for Target(s). The 3- and 4-nitrosobenzenesulfonic acid salts, compounds 7 and 8, would serve well for RAMols in these circumstances, though affinity could be further increased through the use of additional electron withdrawing groups on the benzene ring. An aqueous solution containing RAMol will be shaken, stirred or otherwise mixed with a water immiscible solvent containing target. It is likely, though not necessary, that the water immiscible solvent containing target will have previously been washed with an aqueous solvent to remove water soluble interferents/impurities.

After mixing of the aqueous RAMol solution with the water immiscible solution containing target, the phases will be allowed to separate into at least two layers, and then the two phases will be physically separated. The phase containing the adduct will then be extracted in either a continuous or batch fashion with a water immiscible solvent that has been heated to a substantially higher temperature than that employed for the initial formation of the adduct. Alternatively, the aqueous solution containing adduct may be heated and extracted continuously or in a batch process with water immiscible solvent that may or may not have been heated. Target may be isolated from the formerly heated water immiscible extracts by evaporation or extraction into some other phase, as appropriate.

Operation of an Example of the Liquid-Liquid Chromatography Variant of the RAC Method for 1,3-Diene Purification: One or More Target(s) of a Target Class Present When more than one member of a target class is present in a mixture and it is desirable to achieve the separation of the multiple target from each other, as well as from the interferents/impurities that are not members of the target class, it may or may not be desirable to employ affinity modification. In another embodiment, it may be undesirable to employ the pH changes involved in one embodiment of affinity modification due to some undesirable influence that these changes may have on the target. In these instances, more conventional extractive methods, with or without the use of a thermal release variant may be desirable.

In the simplest of these non-affinity modification variants, a water immiscible solution of the sample composition (that preferably has been previously extracted with an aqueous solution) will be extracted with one or more portions of aqueous solutions of the RAMol. Reaction of target with the RAMol will produce water soluble adduct(s) that will be localized in the aqueous phases. The combined aqueous extracts will then be extracted with a water immiscible solvent to recover target, this being possible due to the reversible nature of the affinity reaction. In one embodiment, one will perform these latter extractions using a hot water immiscible solvent or heat both the aqueous and water immiscible solvents.

Another embodiment of the non-affinity modifications separation would be conducted in the fashion of droplet countercurrent chromatography, in which small droplets of an eluent pass through an immiscible solution. This variant will likely be advantageous in those circumstances in which two or more members of the target class are present, and there is a subtle difference in the reactivity of the two or more targets with the RAMol. This droplet countercurrent chromatography embodiment may, for example, be performed with either the aqueous RAMol containing phase as the stationary phase, or the water immiscible solvent as the stationary phase.

Example 4

Specific Application: Alkene Purification through Reversible

Cycloaddition Reactions

The same 4+2 cycloaddition reaction that served as the affinity reaction for the purification of dienes could be used in the reverse sense. In other words, use of a 1,3-diene capable of adopting an s-cis geometry as the RFG in a RAMol provides a method for the purification of dienophiles, using the common definition of dienophile as being a carbon-carbon or carbon-heteroatom double or triple bond that is capable of undergoing a 4+2 cycloaddition reaction.

In another embodiment, one may purify alkenes by the same principle as described above, but utilizing alternative types of cycloaddition reactions, e.g. 3+2 cycloaddition reactions.

Example 5

Figure 8:
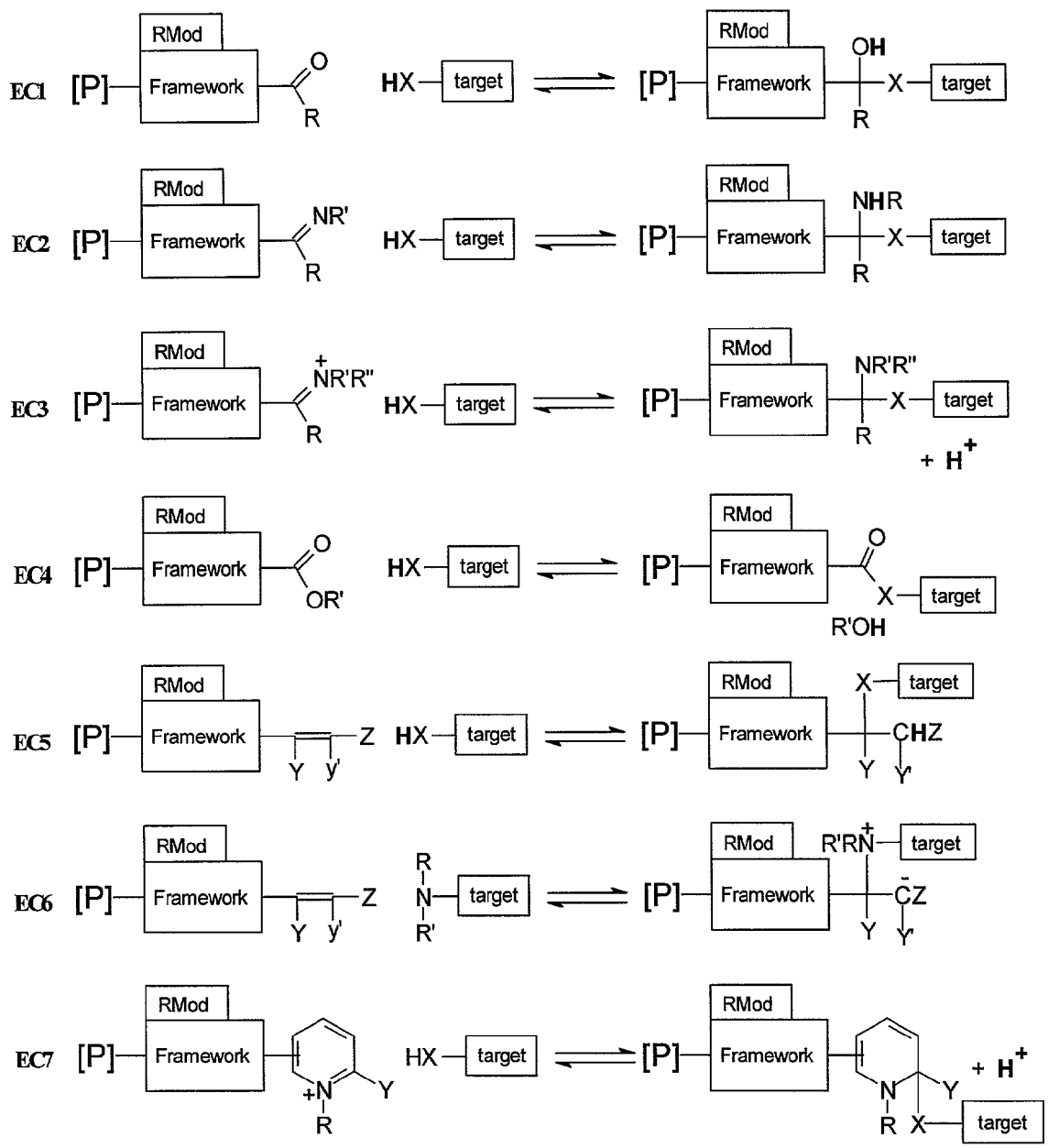
FIG. 8. Generalized descriptions of example RAMols that may be used for the purification of alcohols, amines and thiols. In this Figure, R, R', R" are each independently chosen from H, alkyl, aryl, and heteroaryl; Y, Y'=each independently are chosen from at least one additional RMod group, H, alkyl, aryl, and heteroaryl; X isO, S, NH, N—, or NR; Z is an anion stabilizing group, and [P] is a phase separating groups, such as, for example, a natural or synthetic polymer or some other group giving phase separation from solutions that substantially dissolve interferents/impurities.

Specific Application: Alcohol, Amine and Thiol Purification through Addition Reactions to Electrophilic Carbons Alcohols, amines and thiols are known to add in a reversible fashion to a number of types of electrophilic carbons. These reversible reactions may serve as the basis of the naturally reversible reaction between an RFG and a target for the purification of alcohols, amines and thiols. Several examples of this type of reversible reaction are illustrated in FIG. 8. The EC(number) designations in FIG. 8 represent different types of electrophilic carbons that can be used for this purpose. Also illustrated in greater detail in tables 2–5.

In FIG. 8, the same considerations with respect to the nature of the framework and RMod apply as those outlined above. Though only one RMod is shown, more may be employed, and the nature of the framework chosen for a particular purification may influence the separation in its own right.

The reactive portion of the RFG is shown on the left hand side of the equation, with the adduct being formed shown on the right. The letter X s the reactive portion of the target that undergoes a naturally reversible reaction with the RFG of the RAMol. The letter Z represents an anion stabilizing group. Many anion stabilizing groups are known to those familiar with organic chemistry, and in the context of the example given here it should be understood to include any group that enables a Michael reaction (also known as a conjugate addition reaction, or 1,4-addition reaction). Example of anion stabilizing groups, include, but are not limited to nitro, ketone, ester, amide, sulfoxide, sulfone, and phosphonium.

The rates of these reactions, and the affinities of the RAMol for members of the target class are generally increased by decreasing the electron density at the reacting carbon. This may be accomplished by a framework that is itself electron deficient (e.g., a pyridine ring), or by the incorporation of RMod groups that are electron withdrawing by virtue of inductive effects (e.g., fluoro, other halo, positively charged groups), or groups that are electron withdrawing by virtue of resonance effects (e.g., nitro, carboxylate, carboxylic ester, ketone, aldehyde, amide, and many others). Alternative or additional RMod groups may effect other aspects of the formation of adducts include groups that increase or decrease selectivity between members of the target class. These modifications to selectivity may be the result of steric interactions between the RMod and a portion of the target, or may result from weak attractive or repulsive interactions such as hydrophobic effects, dipole-dipole interactions, hydrogen bonding and charge-charge interactions. The discriminating influences that these additional/alternative RMods impart may include, but are not limited to discrimination on the basis of chirality in targets.

Examples of Influencing the Retention of Targets for Electrophilic Carbon Based Reaction Affinity Chromatography Supports One may enhance the extent of equilibrium binding, i.e., the affinity of a target for the RAMol, by influencing the equilibrium constant for naturally reversible reaction between a target and the RAMol to form an adduct. Though, under a given set of conditions, it may not be possible to influence the magnitude of the equilibrium constant for formation of an adduct, it may be possible to increase the rate at which equilibrium is attained. This may be important for some of the reactions illustrated in FIG. 8, since some of the reactions shown may be slow, leading to incomplete binding to the support, and hence lower than desirable retention. The reason that some of the reactions may be slow lies with the fact that the addition of RXH to an electrophilic carbon will generally involve a proton transfer from X to a group attached to the electrophilic carbon (examples EC1, EC2, EC4, EC5; proton transferred shown in bold). The rate of attainment of equilibrium may therefore be increased by the use of co-additives that facilitate this process. Co-additives comprise non-nucleophilic bases and/or acids, and will most typically be an organic buffer system (e.g., a combination of triethylamine and triethylammonium halide).

One may also decrease affinity through competitive binding. The affinity of a target for the stationary phase will be determined by the proportion of time that the target is in the form of an adduct with the RAMol vs. the time that it is in solution in the mobile phase. Therefore, if there are additional compounds present that can compete with the target for reaction with the RFG, then that competition will decrease the relative amount of target that is present as the adduct. Thus, the affinity of a target for the stationary phase will be effectively larger when there are no species present that can compete with it for the RFG. This behavior may be used to advantageously increase the rate of recovery from the stationary phase. For example, a target alcohol dissolved in a solvent having no alcohol or other nucleophilic species could be absorbed to a RAMol having the general structures given in EC1–5 and EC7 and the stationary phase washed to remove impurities. Recovery rates of the target could then be enhanced by addition of an alcohol containing solvent, or pure alcohol, which would compete according to the Law of Mass Balance and thereby favor an equilibrium non-adsorption of the target.

The affinity modification just described represents the operation of a batch-type process. This affinity modification can also be accomplished by the purposeful mixing of a competing molecule of the target class in the initial loading, and subsequent eluting solvent. Alternatively, the amount of competing substance can be increased gradually, in the matter of a gradient elution. The competition for the RFG can also be built into the RAMol in some instances. For example, if the R' of R'O in EC4 is covalently attached to the framework, then it will compete for the electrophilic carbon intramolecularly, and the degree of this competition will be crudely controllable by the length of the spacer between R' and the framework.

Affinity Modification through Thermal and Concentration Effects

The addition reactions to electrophilic carbons have the same general form as that given for the cycloaddition reactions described above. Therefore, the equilibrium concentrations bound to the RAMol will be influenced by many of the same factors, including absolute concentration and temperature. Thus, targets that have been loaded to a stationary phase can be released at enhanced rate by dilution, and by increases in temperature.

Example 6

Preparation of RAMols

Figure 9:
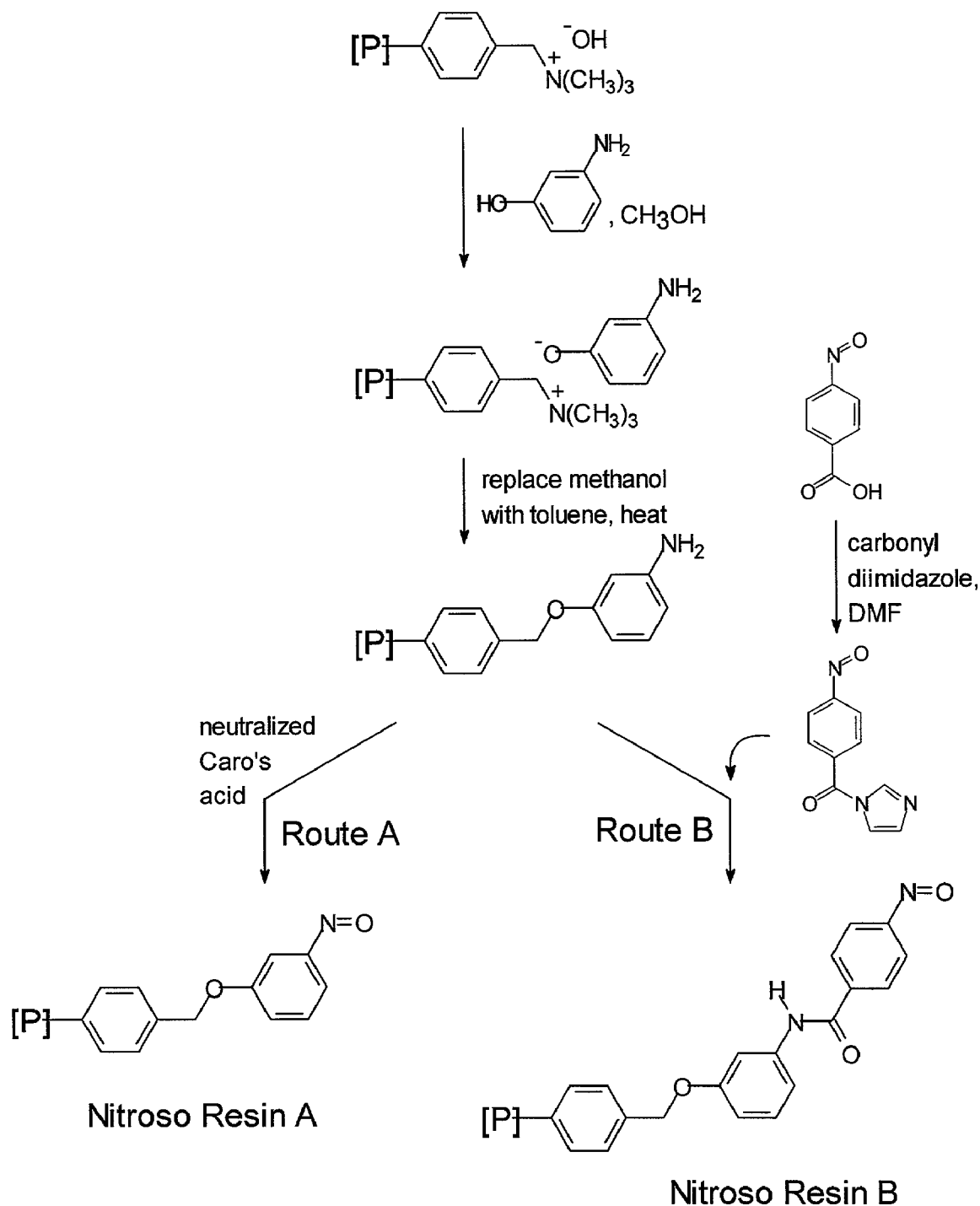
FIG. 9. Examples of general strategies to prepare an affinity resin.

There are a number of different ways in which RAMol bound to a phase separating group may be prepared to form a chromatographic resin. Two general strategies are illustrated in FIG. 9. In one of these (Route A), an aromatic amine on a solid support is oxidized to a nitroso compound, while in the other (Route B), a preformed nitroso compound is attached to the resin. Thus, a solution of 3-aminophenol in methanol is added to a macroreticular strong anion exchange resin (e.g., Amberlite A-26) in the hydroxide form to give the ionically bound 3-aminophenolate. Replacement of the methanol solvent with toluene is followed by heating at reflux to effect the covalent attachment of the 3-aminophenol in the form of an ether linkage. In route A, the amino group is oxidized to give the nitroso resin A using a partially neutralized solution of Caro's acid. In route B, the amino group of the covalently attached 3-aminophenylether is reacted with the acyl imidazolide derived from the known 4-nitrosobenzoic acid to give nitroso resin B. Although the methods just described involve the elaboration of an ion exchange resin to give an arylamine resin, it would also be possible to use a known or existing arylamine resin as a starting point for the synthesis of the nitroso resin. Adddi-tionally, while a macroreticular ion exchange resin is used in the examples above, non-macroreticular solid phase supports could also be used, whether based on polystyrene or otherwise. Any of a number of reagents could be employed for the coupling reaction between the acid and the amine (e.g., dicyclohexylcarbodiimide).

While the synthesis of resin B involved reaction of an activated acyl group with an amino group of the resin, the reverse strategy could also be employed, e.g., the reaction of an activated group on a resin with an amino group of a nitroso precursor molecule. This is illustrated in FIG. 10, in which a support having a carboxylic acid group (e.g., the macroreticular Amberlite IRP-64) is activated with carbonyl diimidazole followed by addition of 3,5-diaminobenzoic acid. Oxidation of the resulting resin leads to the formation of a chromatographic nitroso resin in which the affinity of the resin can be altered from high (in the —COOH state) to low (in the —COO— state) by increasing the pH of the eluting solvent.

Preparation of a 3-alkoxynitrosobenzene Affinity Resin (poly 4-(3'-nitrosophenoxymethyl)vinylbenzene)—Nitroso Resin A (FIG. 9)

A sample of macroreticular poly 4-(benzyltrimethylammonium)vinylbenzene (Amberlyst® A26, 50 g, 60 wt % water by Certificate of Analysis) was treated with a solution of 20% (w/w) aqueous sodium hydroxide (50 mL). The resulting suspension was shaken approximately eighteen hours, filtered through a sintered glass funnel, and the solids washed with de-ionized water (3×50 mL) and methanol (3×50 mL), applying vacuum after each wash to remove solvent. Following the final methanol wash, vacuum was maintained to dry the resin to a free flowing solid. The resin was transferred to an Erlenmeyer flask and treated with a solution of 3-aminophenol (6.1 g) in methanol (50 mL). The resulting suspension was shaken for 1 hour and filtered through a sintered glass funnel. Vacuum was maintained until the resin was a free flowing solid. Residual 3-aminophenol from the filtrate was reapplied to the resin as a solution in methanol (20 mL) in an Erlenmeyer flask. After standing for one hour, the resin was filtered under vacuum and dried as above to a free flowing solid, which was combined with xylenes (200 mL) and refluxed in a flask equipped with a Dean-Starke trap and condenser for a period of approximately one hour. Removal of the Dean-Starke trap was followed by continued reflux for approximately 24 hours, after which time the mixture was cooled to room temperature, filtered, washed with methanol (4×50 mL), and dried as above. The resulting resin was shaken for 30 minutes in a solution of acetic acid (5 mL) and methanol (50 mL), then filtered, transferred to a Soxhlet extractor, extracted with methanol for approximately 24 hours, filtered and dried as above to a free flowing solid.

The dried resin was added to a solution of Oxone® (2 $KHSO_5/KHSO_4/K_2SO_4$, 20 g) in water (120 mL), and the resulting suspension shaken for one hour. Shaking was continued for another hour after adjusting the measured pH from 1.1 to approximately 5.3 by addition of solid sodium bicarbonate to the swirled mixture, and water as necessary to dissolve any remaining white solids. The resin was then filtered through a sintered glass funnel, and washed with water (4×50 mL) and methanol (4×50 mL). If color is observed in the methanol wash it may be desirable to extract the resin with methanol in a Soxhlet extractor for 24 hours. The resulting resin may be used "as is," as a methanol-damp preparation, or dried to a free flowing solid by passage of air through the resin in a vacuum filter funnel. The final yield of dry Nitroso Resin A is approximately 25 g.

Example 7

Adsorption of Thebaine by Affinity Resin

A stock solution of thebaine (1 mg/mL) in methanol was analyzed by High Pressure Liquid Chromatography (HPLC) to determine a standard response using a UV detector operating at 254 nm. This stock solution (8 mL) was combined with free flowing, dry Nitroso Resin A (5 g), the contents gently swirled to remove air pockets, and the resulting suspension allowed to stand un-disturbed for 1 hour. A sample of the supernatant liquid phase was analyzed by HPLC. The integrated area of the thebaine peak was 5.6% the original value, corresponding to adsorption of 94.6% of the thebaine by the resin.

Example 8

Selective Adsorption of Thebaine in a Mixture of Thebaine, Codeine and Morphine

A stock opiate solution of morphine, codeine, and thebaine in methanol (each at 3 mg/mL) was analyzed by High Pressure Liquid Chromatography (HPLC) to determine a standard response using a UV detector operating at 254 nm. Integrated counts by the detector are given in the Table, with values normalized to the codeine integration given in parentheses. This stock opiate solution (8 mL) was combined with free flowing, dry Nitroso Resin A (5 g), and the mixture swirled gently to remove air pockets. The resulting suspension was allowed to stand un-disturbed for 1 hour, and then a sample of the supernatant was analyzed by HPLC; the results of the analysis are given in Table 1, along with the percentage of each alkaloid remaining after the resin treatment.

TABLE 6

| Alkaloid | Integrated Counts (codeine normalized) Before Resin Treatment | Integrated Counts (codeine normalized) After Resin Treatment | Percentage remaining after Resin Treatment |
| --- | --- | --- | --- |
| Morphine | $6.88 \times 10^6$ (1.12) | $1.99 \times 10^6$ (1.26) | 29% |
| Codeine | $6.17 \times 10^6$ (1.00) | $1.58 \times 10^6$ (1.00) | 26% |
| Thebaine | $29.0 \times 10^6$ (4.70) | $0.95 \times 10^6$ (0.60) | 3.3% |

The HPLC results show a similar degree of what appears to be non-specific adsorption of codeine and morphine by the resin, but almost complete adsorption of thebaine. It is also noteworthy that, within experimental error, the amount of thebaine adsorbed in this experiment is the same as when thebaine alone was exposed to the resin (cf. Example 7), indicating that morphine and codeine do not compete for thebaine binding sites. Thebaine was recovered from the resin by repetitive extraction with portions of hot methanol (40 mL each). Quantitative HPLC data was not obtained because of the presence of unknown impurities that overlapped with the codeine and morphine peaks; however, all extracts were markedly enriched in thebaine relative to these compounds.

I claim:

1. A method of separating a target from a sample composition containing the target, comprising the following steps:
   (a) contacting the sample composition with a reactive affinity molecule attached to a phase separating group, the reactive affinity molecule comprising a reactive functional group, and the reactive affinity molecule reacting with the target to farm an adduct by forming a covalent bond between the target and the reactive functional group, where the reaction forming the adduct is reversible under the conditions of the contacting without the addition of a reagent acting at the covalent bond, to reform the target and reactive affinity molecule
   (b) separating the adduct from the sample composition;
   (c) contacting the adduct with an eluent to regenerate the target and the reactive affinity molecule; and
   (d) separating the target from the reactive affinity molecule.

2. The method of claim 1 where the reactive functional group comprises a group chosen from N═N, C═C, C═O, N═O, C═N, C═S, and C≡C.

3. The method of claim 1 where the target comprises a 1,3-diene and the reactive functional group comprises a nitroso group.

4. The method of claim 1 where the target comprises a hydroxy, mercapto, or amino group and the reactive functional group comprises an aldehyde group.

5. The method of claim 1 where the target comprises a hydroxy, mercapto, or amino group and the reactive functional group comprises an alkene substituted by an anion stabilizing group.

6. The method of claim 1 where the target comprises a hydroxy, mercapto, or amino group and the reactive functional group comprises a ketone.

7. The method of claim 1 where the target comprises a hydroxy, mercapto, or amino group and the reactive functional group comprises an iminium group.

8. The method of claim 1 where the target comprises a hydroxy, mercapto, or amino group and the reactive functional group comprises a carboxylate ester.

9. The method of claim 1 where th reactive affinity molecule is attached to the phase separating group by a covalent bond, chemisorption, or ion-pairing.

10. The method of claim 1 where the phase separating group is a solid.

11. The method of claim 10 where the solid is chosen, from polymers, silica, alumina, and carbon.

12. The method of claim 11 where the solid is a polymer.

13. The method of claim 12 where the solid is a macroreticular polymer.

14. The method of claim 12 where the solid is chosen from polyethers, polyamides, polyesters, and polyenes.

15. The method of claim 12 where the solid is chosen from polyacrylates and polystyrene.

16. The method of claim 10 where the solid is a stationary phase of a chromatographic column.

17. The method of claim 1 where the phase separating group comprises a group that imparts to the adduct solubility in a liquid.

18. The method of claim 17 where the group that imparts solubility in a liquid is a water solubilizing group.

19. The method of claim 18 where the group that imparts solubility in a liquid is chosen from sulfate, sulfonate, phosphate, phosphonate, carboxylate, ammonium, phosphonium, sulfonium, and guanidinium ions, polyhydric alcohols, and polyethers.

20. The method of claim 17 where the group that imparts solubility in a liquid imparts solubility in a water immiscible phase.

21. The method of claim 1 where the reactivity molecule further comprises a reactivity modifier group.

22. The method of claim 21 where the reactivity modified group comprises an acidic group chosen from carboxylic adds, phenols, ammonium cations, phosphates, phosphate esters, phosphonates, and phosphonate esters.

23. The method of claim 21 where the reactivity modifier group comprises a basic group chosen from amines, heteroaryl amines, carboxylates, phenolates, phosphate anions, and phosphonate anions.

24. The method of claim 21 where the reactivity modifier group is chosen from halogens, nitro groups, cyano groups, hydroxyl groups, alkoxy groups, fluoroalkyl groups, perfluoroalkyl groups, nitrile groups, carboxyl groups, carboxylic ester groups, amide groups, sulfoxide groups, sulfone groups, carbonyl groups, and ammonium groups.

25. The method of claim 21 where the reactivity modifier group is chosen from hydroxyl groups, amine groups, monoalkylamine groups, dialkylamine groups, and alkoxy groups.

26. The method of claim 21 where the reactivity modifier group alters a property of the reactive functional group chosen from electronic characteristics, steric availability, and chirality.

27. The method of claim 21 where the eluent changes the equilibrium constant of the reaction by modifying the reactivity modifier group.

28. The method of claim 1 where the reactive affinity molecule further comprises a framework group.

29. The method of claim 28 where the framework group comprises a group chosen from alkyl groups, aryl groups, and heteroaryl groups.

30. The method of claim 1, where the reactive affinity molecule comprises a group of formula

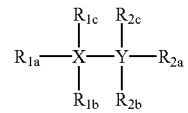

where $R_{1a}$, $R_{1b}$, $R_{1c}$ $R_{2a}$, $R_{2b}$ and $R_{2c}$ are each independently absent or are chosen from H, alkyl groups, aryl groups, heteroaryl groups, framework groups, reactivity modifier groups, framework groups with reactivity modifier groups, a direct bond between X and Y, and a direct bond to a phase separating group; and where X and Y are each independently chosen from C, O, N, and S, and each independently may have a positive or a negative charge.

31. The method of claim 30 where the reactive affinity molecule comprises a group chosen from $R_{1a}(R_{1b})C=C(R_{2a})R_{2b}$, $R_{1a}(R_{1b})C=O$ $R_{1a}(R_{1b})C=N-R_{2a}$, and $R_{1a}-N=O$.

32. The method of claim 1 where the reactive affinity molecule comprises a group of formula

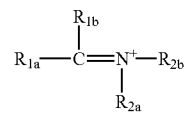

where $R_{1a}$, $R_{1b}$, $R_{2a}$, and $R_{2b}$ are each independently chosen from H, alkyl groups, aryl groups, heteroaryl groups, framework groups, reactivity modifier groups, framework groups with reactivity modifier groups, and a direct bond to a phase separating group;

or where $R_{1a}(R_{1b})C=N^+(R_{2a})R_{2b}$ forms a ring structure.

33. The method of claim 1 where the reactive affinity molecule comprises a group of formula

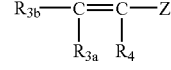

where $R_{3a}$, $R_{3b}$ and $R_4$ are each independently chosen from H, alkyl groups, aryl groups, heteroaryl groups, framework groups, reactivity modifier groups, framework groups with reactivity modifier groups, and a direct bond to at least one phase separating group; and where Z comprises an anion stabilizing group.

34. The method of claim 33 where Z comprises a group chosen from nitro, ketone, ester, amide, sulfoxide, sulfone, nitrile, iminium, and phosphonium groups.

35. The method of claim 1, where the reactive affinity molecule comprises a group of formula

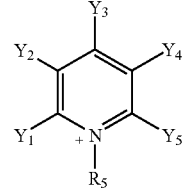

where $R_5$ is chosen from H, alkyl groups, aryl groups, heteroaryl groups, framework groups, reactivity modifier groups, framework groups with reactivity modifier groups, and a direct bond to at least one phase separating group; and where $Y_1$, $Y_2$, $Y_3$, $Y_4$, and $Y_5$ are each independently chosen from H, alkyl groups, aryl groups, heteroaryl groups, framework groups, reactivity modifier groups, framework groups with reactivity modifier groups, and a direct bond to at least one phase separating group.

36. The method of claim 1, where the reaction comprises the formation of at least two covalent bonds.

37. The method of claim 1 where the eluent is chosen from water, alcohols, hydrocarbons, and ethers.

38. The method of claim 37 where the eluent is chosen from methanol, ethanol, propanol, isopropanol and butanol.

39. The method of claim 37, where the eluent is chosen from benzene, toluene, xylenes, mesitylenes, hexanes, heptanes, octanes and nonanes.

40. The method of claim 37, where the eluent is chosen from propyl ethers and butyl ethers.

41. The method of claim 1, where the eluent has a property chosen from polarity, temperature, and pH that is different from the corresponding property of the sample composition.

42. The method of claim 41 where the eluent has a temperature that is different from the temperature of the sample composition.

43. The method of claim 1 where the half-life of the reaction is about 4 hours or less at 25° C. under the contacting conditions.

44. The method of claim 1 where the step of contacting the adduct with the eluent also separates the target from the reactive affinity molecule.

45. The method of claim 1 where the target is chosen from ergosterol, thebaine, and vitamin D.

46. A method for isolating thebaine from a sample composition, comprising reversibly separating the thebaine from the sample composition by reverse affinity chromatography using with a reactive affinity molecule of the formula:

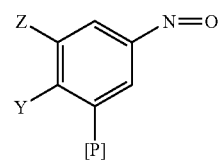

where Y and Z are each independently chosen from H, alkyl groups, aryl groups, heteroaryl groups, framework groups, reactivity modifier groups, and framework groups with reactivity modifier groups; and is a phase separating group.

* * * * *